(12) United States Patent (10) Patent No.: US 6,873,772 B2
Nakaya (45) Date of Patent: Mar. 29, 2005

(54) OPTICAL FIBER TAPE WITH OPTICAL FIBER ARRAY

(75) Inventor: Ken-ichi Nakaya, Tokyo (JP)

(73) Assignee: NEC Corporation, Tokyo (JP)

( * ) Notice: Subject to any disclaimer, the term of this patent is extended or adjusted under 35 U.S.C. 154(b) by 187 days.

(21) Appl. No.: 10/078,406

(22) Filed: Feb. 21, 2002

(65) Prior Publication Data

US 2002/0122641 A1 Sep. 5, 2002

(30) Foreign Application Priority Data

Feb. 22, 2001 (JP) ........................................ 2001-046662

(51) Int. Cl.$^7$ ................................................ G02B 6/44
(52) U.S. Cl. ........................ 385/114; 385/105; 385/110
(58) Field of Search ................................ 385/114, 105, 385/106, 109, 110, 111, 112

(56) References Cited

U.S. PATENT DOCUMENTS 6,498,882 B1 * 12/2002 Buckelew et al. .......... 385/114

FOREIGN PATENT DOCUMENTS

JP 6-148480 5/1994

* cited by examiner

Primary Examiner—Chandrika Prasad
(74) Attorney, Agent, or Firm—McGinn & Gibb, PLLC

(57) ABSTRACT

A tape optical fiber cord with an optical fiber array has, at its one end, a half pitch fiber array connected to an optical waveguide. Connectors are connected respectively to connector-side optical fibers located at the other end of the tape optical fiber cord. A branching case for branching the connector-side optical fibers is provided in a position between both ends of the cord. One end of a tape fiber comprising tapes arranged in two columns of two stages is fixed to the half pitch fiber array, and the other end is fixed in a fixation section within the branching case to the case. In the portion intermediate between the two fixed portions, the connector-side optical fibers are separated one by one, and the outside of the separated optical fibers is covered with a protective tube while leaving a space between the protective tube and the separated optical fibers. By virtue of the above construction, the tape optical fiber cord with an optical fiber array can minimize the occurrence of microbends in a local potion of the optical fibers even when a portion between both ends of a tape, in which a plurality of optical fibers have been arranged, has been bent, because the optical fibers are deformed independently of one another upon the application of external force and, thus, any excessive stress is not applied to the optical fibers.

21 Claims, 22 Drawing Sheets

OPTICAL FIBER TAPE WITH OPTICAL FIBER ARRAY

FIELD OF THE INVENTION

The invention relates to a tape optical fiber cord with an optical fiber array as a tape optical fiber cord to which an optical fiber array has been attached, and more particularly to a tape optical fiber cord with an optical fiber array which can reduce the occurrence of microbends.

BACKGROUND OF THE INVENTION

The spread of the Internet and an increase in the capacity of data to be transmitted have led to a massive increase in traffic. This tendency has led to energetic development of technology for increasing the capacity of optical wavelength multiplex communication systems.

When devices constituting a communication system are connected to each other through a plurality of optical fibers, a method, wherein a bundle of a plurality of optical fibers is provided and is used for connection between these devices, is in many cases more convenient than a method wherein the devices are connected to each other by separately drawing these optical fibers one by one. In this case, a tape optical fiber cord (hereinafter often referred to as "tape fiber"), in which a plurality of optical fibers are juxtaposed and are then covered to bring the optical fiber into a tape, is used.

FIG. 1 shows a fiber cord with a half pitch fiber array which is an example of this type of conventional tape fibers. The term "half pitch" as used herein means that optical fibers are arranged at a spacing (around 125 $\mu$m) of substantially the half of general optical fiber arrangement spacing (typically around 250 $\mu$m) as full pitch in fiber cords. In the example of the fiber cord shown in FIG. 1, one end of the fiber cord 111 with a half pitch fiber array is fixed to a half pitch fiber array 112 with a pitch of 127 $\mu$m, and the fiber cord comprises four tapes of a first upper tape $113_1$, a second upper tape $113_2$, a first lower tape $113_3$, and a second lower tape $113_4$ which are arranged in two stages. In these tapes (first upper tape $113_1$, second upper tape $113_2$, first lower tape $113_3$, and second lower tape $113_4$), optical fibers are arranged at a full pitch.

FIG. 2 shows the sectional structure of this fiber cord with a half pitch fiber array. It is assumed that each of the four tapes of the first upper tape $113_1$, the second upper tape $113_2$, the first lower tape $113_3$, and the second lower tape $113_4$ comprises a 12-core tape core in which 12 optical fibers 115 are arranged. In this example, the pitch of the optical fibers 115 in each of the tapes $113_1$ to $113_4$ is 250 $\mu$m.

In one end of the fiber cord 111 with a half pitch fiber array, the optical fibers constituting the four 12-core tape core are separated one by one into 48 optical fibers $115_1$ to $115_{48}$. Optical connectors $117_1$ to $117_{48}$ for input/output of optical signals are connected to the respective ends of the optical fibers $115_1$ to $115_{48}$.

FIG. 3 shows the arrangement of optical fibers in a fiber aligning section located on the side of an optical waveguide (not shown). On the inlet side of the half pitch fiber array 112 shown in FIG. 1, 48 optical fibers in total in the fiber cord 111 with a half pitch fiber array shown in FIG. 1 are arranged as shown in FIG. 2. In the fiber aligning section 121 located on the opposite side of the inlet side, the optical fibers are arranged in one stage at a pitch of 127 $\mu$m. Thus, on the optical waveguide side, the arrangement structure is such that, in consideration of a demand for multichannel and a reduction in size of devices, the pitch of output side waveguides has been reduced to the half of the pitch, that is, the half pitch, of the optical fibers 115 on the tapes $113_1$ to $113_4$ side. In the fiber cord 111 with a half pitch fiber array in this example, a two-stage arrangement structure is adopted as shown in FIG. 1 or 2. Therefore, at a portion before the fiber aligning section 121, the optical fibers 115 are taken out one by one from the upper stage and the lower stage by turns and are aligned in the fiber aligning section 121.

FIG. 4 shows the rearrangement of the optical fibers in the fiber array. The numerals from "1" to "48" in this drawing (FIG. 4) and FIGS. 1 and 3 designate serial numbers of the optical fibers. Even when the numbers of the optical fibers $115_1$ to $115_{48}$ are regularly permuted one by one in an ascending order on the fiber aligning section 121 side, the optical fibers $115_1$ to $115_{48}$ are distributed to and arranged in the four tapes $113_1$ to $11_{34}$. As a result, on the other end side of the fiber cord 111 with a half pitch fiber array, as shown in FIG. 1, the optical connectors $117_1$ to $117_{48}$ are arranged in intermittent permutation. Therefore, workers responsible for connection of the optical connectors $117_1$ to $117_{48}$ should perform connection work while selecting corresponding optical fibers 115, for example, from the first tape $113_1$ and the third tape $113_3$. This makes the work troublesome, requires a prolonged work time, and, at the same time, increases the probability of the incidence of mistakes in the work.

FIG. 5 shows a conventional fiber cord with a half pitch fiber array which has overcome the above problems. In FIGS. 5 and 1, like parts are identified with the same reference numerals, and the overlapped explanation thereof will be omitted. In this fiber cord 131 with a half pitch fiber array, a branching case 132 is provided between the half pitch fiber array 112 and the optical connectors $117_1$ to $117_{48}$.

In the fiber aligning section 121 as the end on the optical waveguide (not shown) side in the half pitch fiber array 112, the optical fibers 115 are regularly arranged one by one in an ascending order as shown in FIG. 3. Therefore, the arrangement of the optical fibers 115 between the half pitch fiber array 112 and the branching case 132 is the same as shown in FIG. 3. In the branching case 132, the optical fibers 115 arranged in this way are rearranged. Specifically, in the first tape $133_1$, optical fibers "1" to "12" in the optical fibers 115 are arranged in that order, and, in the second tape $133_2$, optical fibers "13" to "24" in the optical fibers 115 are arranged in that order. Likewise, in the third tape $133_3$, optical fibers "25" to "36" in the optical fibers 115 are arranged in that order, and, in the fourth tape $133_4$, optical fibers "37" to "48" in the optical fibers 115 are arranged in that order. Therefore, workers can correctly mount the optical connectors $117_1$ to $117_{48}$ in a short time.

FIG. 6 shows wiring in the interior of the branching case. Here for simplification of the drawing, only optical fibers "1" to "24" in the optical fibers 115 are shown. The first upper tape $113_1$ shown in FIG. 5 and the first lower tape $113_3$ not shown in FIG. 5 are connected to the left side (half pitch fiber array 112 side) in the drawing of the branching case 132. On the other hand, the first upper tape $133_1$ and the first lower tape $133_3$ both shown in FIG. 5 are connected to the right side (optical connectors $117_1$ to $117_{24}$ side) in the drawing of the branching case 132. For clarification of the drawing, the first upper tapes $113_1$, $133_1$ are indicated by a solid line, and the first lower tapes $113_3$, $133_3$ are indicated by a dotted line. In the interior of the branching case 132, optical fibers are connected so as to realize the change in arrangement of left and right optical fibers. In this way, when the branching case 132 shown in FIG. 6 is used, the work of connection between the tape optical fiber cord 131 with an optical fiber array and the optical connectors $117_1$ to $117_{48}$ can be smoothly carried out without difficulty.

The conventional fiber cord 111 with a half pitch fiber array shown in FIG. 5, however, has a problem that, since one end thereof is fixed to the branching case 132, microbends often occur. Here the term "microbends" means that the application of uneven force to the optical fibers 115 causes bends having a radius which is large and is not negligible as compared with the wavelength of light propagated through the core. When microbends occur, light propagated through the core is leaked out from the microbends to the outside of the optical fiber, leading to transmission loss. Due to this unfavorable phenomenon, a difference in characteristics occurs among the optical fibers 115 constituting the tape optical fiber cord with an optical fiber array.

For example, Japanese Patent Laid-Open No. 148480/1994 discloses a method for preventing the occurrence of microbends. In this method, before a molded product of a tape optical fiber core is wound, the tape is coated with a silicone oil dissolved in a volatile solvent to increase the lubricity of the tape, whereby the wound state of the tape is improved to avoid the application of uneven force to the optical fiber core and thus to prevent the occurrence of microbends. The invention solves the problem of the occurrence of microbends during the production of the tape optical fiber cord and, at the same time, solves the problem of the occurrence of microbends during the use of the produced tape optical fiber cord with an optical fiber array.

FIG. 7 illustrates microbends which occur during the use of the tape optical fiber cord with an optical fiber array using the branching case shown in FIG. 5. The branching case 132 is connected to the tape optical fiber cord 131 with an optical fiber array in its end remote from the half pitch fiber array 112, and the portion between both ends of the tape optical fiber cord is partially wound. In the where the cable is disposed between communication devices not shown, it is common practice to use a tape optical fiber cord 131, with an optical fiber array, having a length which is somewhat larger than necessary, for example, in consideration of relocation of the devices in the future. In this case, the cord portion between both ends of the tape optical fiber cord is partially wound by a predetermined number of times to regulate the whole length.

In FIG. 7, for easy understanding of the explanation, as with FIG. 6, the first upper tape $113_1$ is indicated by a solid line, and the first lower tape $113_3$ is indicated by a dotted line. The half pitch fiber array 112 is fixed to the left end in the drawing of the tape optical fiber cord 131 with an optical fiber array, and the branching case 132 is fixed to the right end of the tape optical fiber cord 131 with an optical fiber array. The lengths of the first upper tape $113_1$ and the first lower tape $113_3$ between the half pitch fiber array 112 and the branching case 132 are equal to each other.

Assuming that the cord portion between both ends of the tape optical fiber cord 131 with an optical fiber array is partially wound in a given direction once or by a plurality of times, that, as shown in the drawing, in the ring-like bent portion, the first upper tape $113_1$ is placed inside the first lower tape $113_3$, and that the ring-like bent portion is round, the radius R1 of the circle in the first upper tape $113_1$ is smaller than the radius R2 of the circle in the first lower tape $113_3$. Therefore, the length of the circumference in the first upper tape $113_1$ is shorter than the length of the circumference in the first lower tape $113_3$. Since the lengths of the first upper tape $113_1$ and the first lower tape $113_3$ between the half pitch fiber array 112 and the branching case 132 are equal to each other, in the unbent straight portion, the first upper tape $113_1$ is longer by the difference in length in the ring-like bent portion than the first lower tape $113_3$.

This length difference can be determined by equation (1):

$$\Delta L = 2\pi t m \quad (1)$$

wherein

ΔL represents length difference;

t represents spacing between the core of the first upper tape $113_1$ and the core of the first lower tape $113_3$ in the thicknesswise direction in the tape optical fiber cord 131 with an optical fiber array; and m represents the number of times of winding in the ring-like bent portion.

The optical fibers undergo local stress under positional restriction, for example, by a covering material at several sites between both ends of the tape to absorb the excess of length of the first upper tape $113_1$. As a result, the optical fibers are bent, and microbends 134 occur. A fluctuation in environment temperature also accelerates the occurrence of microbends.

In the above explanation, although a two-stage, two-column tape optical fiber cord 131 with an optical fiber array has been taken as an example, any multistage tape optical fiber cord with an optical fiber array has a possibility of posing the same problem of occurrence of microbends as described above. Further, in the above explanation, although the use of the branching case 132 for changing the arrangement of the optical fibers 115 has been taken as an example, the fixation of the optical fiber cord in its end remote from the optical waveguide by any means poses the same problem as described above.

SUMMARY OF THE INVENTION

Accordingly, it is an object of the invention to provide a tape optical fiber cord with an optical fiber array which, even when a tape fiber, in which a plurality of optical fibers have been arranged, has been bent in its portion between both ends thereof, local microbending of the optical fibers can be minimized.

The features of the invention will be summarized below.

(1) A tape optical fiber cord with an optical fiber array, comprising: (i) a fiber array connected to an optical waveguide; and (ii) a tape fiber comprising a tape core section produced by aligning a plurality of optical fibers to be fixed to the fiber array and forming the whole of the aligned optical fibers into a tape, said tape core section being disposed on the fixation side of the fiber array, said tape fiber in its predetermined position, remote from the tape core section, having been fixed, said plurality of optical fibers having been separated, at a part or the whole of the position intermediate between the two fixed portions, into a predetermined number of optical fiber units which is smaller in number than said plurality of optical fibers.

In the tape optical fiber cord with an optical fiber array in the above item (1), one end of a tape fiber is fixed to a fiber array connected to an optical waveguide. In the tape fiber per se, a tape core section produced by aligning a plurality of optical fibers and forming the whole of the optical fibers into a tape is provided in the fiber array on its fixation side, and the tape fiber in its predetermined position remote from the end fixed to the fiber array on its fixation side is fixed. In a part or the whole of the position intermediate between the two fixed portions, the plurality of optical fibers are separated into a predetermined number of optical fiber units. Therefore, upon the application of force in the bending direction to the tape fiber, the optical fibers are freely deformed independently of one another according to the applied force, and the direction of deformation by other optical fibers or the covering member is not restricted. Therefore, force, which locally deforms the optical fibers, is less likely to be applied, and, thus, the occurrence of microbends can be effectively avoided.

(2) A tape optical fiber cord with an optical fiber array, comprising: (i) a fiber array connected to an optical waveguide; and (ii) a tape fiber comprising a tape core section produced by aligning, in a plurality of stages, a plurality of optical fibers to be fixed to the fiber array and forming the whole of the aligned optical fibers into a tape, said tape core section being disposed on the fixation side of the fiber array, said tape fiber in its predetermined position, remote from the tape core section, having been fixed, said plurality of optical fibers having been separated, at a part or the whole of the position intermediate between the two fixed portions, into a predetermined number of optical fiber units which is smaller in number than said plurality of optical fibers.

In the tape optical fiber cord with an optical fiber array in the above item (2), one end of a tape fiber is fixed to a fiber array connected to an optical waveguide. In the tape fiber per se, a tape core section produced by aligning, in a plurality of stages, a plurality of optical fibers and forming the whole of the optical fibers into a tape is provided in the fiber array on its fixation side, and the tape fiber in its predetermined position remote from the end fixed to the fiber array on its fixation side is fixed. In a part or the whole of the position intermediate between the two fixed portions, the plurality of optical fibers are separated into a predetermined number of optical fiber units which is smaller in number than the number of the plurality of optical fibers. Therefore, even when there is a difference in length between the outer circumference and the inner circumference derived from stages such as upper and lower stages, upon the application of force in the bending direction to the tape fiber, the optical fibers are freely deformed independently of one another according to the applied force, and the direction of deformation by other optical fibers or the covering member is not restricted. Therefore, force, which locally deforms the optical fibers, is less likely to be applied, and, thus, the occurrence of microbends can be effectively avoided.

(3) A tape optical fiber cord with an optical fiber array, comprising: (i) a fiber array connected to an optical waveguide; and (ii) a tape fiber comprising a tape core section produced by aligning, in a plurality of stages, a plurality of optical fibers to be fixed to the fiber array and forming the whole of the aligned optical fibers into a tape, said tape core section being disposed on the fixation side of the fiber array, said tape fiber in its predetermined position, remote from the tape core section, having been fixed, said plurality of optical fibers having been arranged, at the position intermediate between the two fixed portions, in one stage, one by one parallel to one another and having been formed into a tape.

In the tape optical fiber cord with an optical fiber array in the above item (3), one end of a tape fiber is fixed to a fiber array connected to an optical waveguide. In the tape fiber per se, a tape core section produced by aligning, in a plurality of stages, a plurality of optical fibers and forming the whole of the optical fibers into a tape is provided in the fiber array on its fixation side, and the tape fiber in its predetermined position remote from the end fixed to the fiber array on its fixation side is fixed. The plurality of optical fibers are arranged, at the position intermediate between the two fixed portions, in a one stage construction, one by one parallel to one another and are formed into a tape. Therefore, the width of this tape portion is increased according to the number of stages in the tape fiber. Unlike the cord described in the above item (2), even when this tape portion is bent in a direction orthogonal to the width, any difference in length derived from stages such as upper and lower stages does not occur between the inner circumference and the outer circumference. Therefore, force, which locally deforms the optical fibers, is less likely to be applied, and, thus, the occurrence of microbends can be effectively avoided. Further, since this large-width portion has been formed into a tape, the cord can be easy to handle even when the length of this tape portion is long.

(4) The tape optical fiber cord with an optical fiber array according to the above item (1) or (2), wherein, in the tape fiber, the region in which said plurality of optical fibers have been separated into a predetermined number of optical fiber units which is smaller in number than said plurality of optical fibers, has been covered with a protective tube.

According to the tape optical fiber cord with an optical fiber array in the above item (4), in the position intermediate between both the ends of the tape optical fiber cord with an optical fiber array according to the above item (1) or (2), the plurality of optical fibers are separated into a predetermined number of optical fiber units which is smaller in number than the number of the plurality of optical fibers. This portion is covered with a protective tube for protection purposes. When the protective tube is provided, the cord is easy to handle even when the length of this portion is long.

(5) The tape optical fiber cord with an optical fiber array according to the above item (3), wherein the portion, in which said plurality of optical fibers have been arranged in one stage one by one parallel to one another and have been formed into a tape, has been covered with a protective tube.

According to the tape optical fiber cord with an optical fiber array in the above item (5), in the tape optical fiber cord with an optical fiber array according to the above item (3), a protective tube is provided for protecting a large-width portion in which the plurality of optical fibers have been arranged in one stage one by one parallel to one another and have been formed into a tape.

(6) The tape optical fiber cord with an optical fiber array according to the above item (4) or (5), wherein the protective tube has been fixed at the predetermined position or a position near the predetermined position.

According to the tape optical fiber cord with an optical fiber array in the above item (6), the protective tube is fixed at the predetermined position, where the tape fiber has been fixed, or a position near the predetermined position. For example, when the tape fiber has been fixed within a predetermined case, the protective tube is fixed to the case in its position where the tape fiber has been fixed, or alternatively the protective tube is fixed at the end of the case. The fixation of the protective tube at the predetermined position or a position near the predetermined position can facilitate the fixation.

(7) The tape optical fiber cord with an optical fiber array according to any one of the above items (1) to (3), wherein a rearrangement section for rearranging the optical fibers is provided at the predetermined position or a position near the predetermined position.

According to the tape optical fiber cord with an optical fiber array in the above item (7), since the tape fiber is fixed at the predetermined position and the end of the protective tube is also fixed at the predetermined position, a rearrangement section is provided in this portion.

(8) The tape optical fiber cord with an optical fiber array according to the above item (4) or (5), wherein a rearrangement section for rearranging the optical fibers is provided at the predetermined position or a position near the predetermined position, and one end of the protective tube has been fixed to one end of a case containing the rearrangement section.

According to the tape optical fiber cord with an optical fiber array in the above item (8), the end of the case for housing therein the rearrangement section is used for the fixation of the protective tube. The fixation of the protective tube to the end of the case facilitates the fixation work and further can eliminate the need to make the inner diameter of the case larger than the size of the protective tube.

(9) The tape optical fiber cord with an optical fiber array according to the above item (4) or (5), wherein a rearrangement section for rearranging the optical fibers is provided at the predetermined position or a position near the predetermined position, and one end of the protective tube has been fixed within a case containing the rearrangement section.

According to the tape optical fiber cord with an optical fiber array in the above item (9), the interior of the case for housing therein the rearrangement section is used for the fixation of the protective tube. The fixation of the protective tube within the case enables the protective tube to be stably mounted.

(10) The tape optical fiber cord with an optical fiber array according to the above item (3), wherein said plurality of optical fibers fixed to the fiber array are arranged in a plurality of columns and in a plurality of stages, and the whole of the optical fibers has been formed into a tape.

According to the tape optical fiber cord with an optical fiber array in the above item (10), the plurality of optical fibers fixed to the fiber array may be arranged in a plurality of stages and, in addition, may be arranged in a plurality of columns of one stage.

(11) The tape optical fiber cord with an optical fiber array according to the above item (10), wherein the number of columns is 2 and the number of stages is 2.

The above item (11) defines a representative example of the tape optical fiber cord with an optical fiber array according to the above item (10), wherein the number of columns is 2 and the number of stages is 2. The number of columns may be a value other than 2, and the number of stages may be a value other than 2. Further, on each stage may be provided a set of a plurality of optical fibers having a different number of columns.

(12) The tape optical fiber cord with an optical fiber array according to the above item (4) or (5), wherein only one end of the protective tube has been fixed.

According to the tape optical fiber cord with an optical fiber array in the above item (12), since only one end of the protective tube is fixed, when the tube has been bent, the other end of the protective tube can be freely moved. This can reduce force applied to the optical fibers provided within the protective tube.

(13) The tape optical fiber cord with an optical fiber array according to the above item (4), wherein the protective tube has been fixed to optical fibers in a part of the region where the said plurality of optical fibers have been separated one by one.

The above item (13) defines an effective fixation form other than the fixation of one end of the protective tube. In a part of the region where the plurality of optical fibers have been separated one by one, the protective tube may be brought into contact with the optical fibers to fix the protective tube. In this case, when the region, in which the protective tube has been fixed by the optical fibers, is long, unnecessary force is applied to this region. Therefore, the protective tube is fixed by a part of the optical fibers. In the fixation site, there is no need to bring the protective tube into contact with all the optical fibers.

(14) The tape optical fiber cord with an optical fiber array according to the above item (5), wherein, in a part of the region in which said plurality of optical fibers have been arranged in one stage one by one parallel to one another and have been formed into a tape, the protective tube has been fixed by the optical fiber tape.

According to the tape optical fiber cord with an optical fiber array in the above item (14), as with the tape optical fiber cord with an optical fiber array according to the above item (13), the protective tube may be fixed in a part of the large-width tape portion.

(15) The tape optical fiber cord with an optical fiber array according to the above item (7), wherein the order of arrangement of the optical fibers delivered from the rearrangement section in its side remote from the fiber array is identical to the order of arrangement of the optical fibers in the fiber array on the optical waveguide side.

According to the tape optical fiber cord with an optical fiber array in the above item (15), the rearrangement section makes the arrangement of the optical fibers, in connections, such as connectors, on the opposite side of optical fiber array, identical to the arrangement of the optical fiber on the optical waveguide side. As defined in the above item (3), when the plurality of optical fibers are arranged, at the position intermediate between the two fixed portions, in a one stage construction, one by one parallel to one another and are formed into a tape, if the arrangement of the optical fibers is identical to the arrangement of the optical fibers on the optical waveguide side, there is no need to provide the rearrangement section at a position between both the ends of the tape optical fiber cord with an optical fiber array.

(16) The tape optical fiber cord with an optical fiber array according to the above item (4) or (5), wherein the protective tube is formed of a flame-retardant material.

According to the tape optical fiber cord with an optical fiber array in the above item (16), the flame redundancy of the protective tube can protect the optical fibers.

(17) The tape optical fiber cord with an optical fiber array according to the above item (4) or (5), wherein the protective tube has been fixed to the fiber array on its fixation side.

As defined in the above item (6), the protective tube may be fixed at the predetermined position or a position near the predetermined position. Alternatively, the protective tube may be fixed to the fiber array on its fixation side which is the opposite side of the predetermined position. When any one end of the protective tube is a free end, the degree of freedom of the protective tube can be ensured.

(18) The tape optical fiber cord with an optical fiber array according to any one of the above items (1) to (3), wherein the pitch of the optical fibers in the fiber array is the half of the pitch (half pitch) of the optical fibers in the tape fiber.

According to the tape optical fiber cord with an optical fiber array in the above item (18), when the tape fiber has a construction such that the optical fibers are arranged at a full pitch, for example, at a pitch of 270 $\mu$m, in two stages, this tape fiber may be fixed to a half pitch fiber array. In this connection, it should be noted that a tape fiber of a pitch other than the above pitch and a fiber array of a pitch other than the above pitch may also be of course used.

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the tape optical fiber cord with an optical fiber array according to the invention will be explained in detail in conjunction with the accompanying drawings.

<First Preferred Embodiment>

Figure 8:
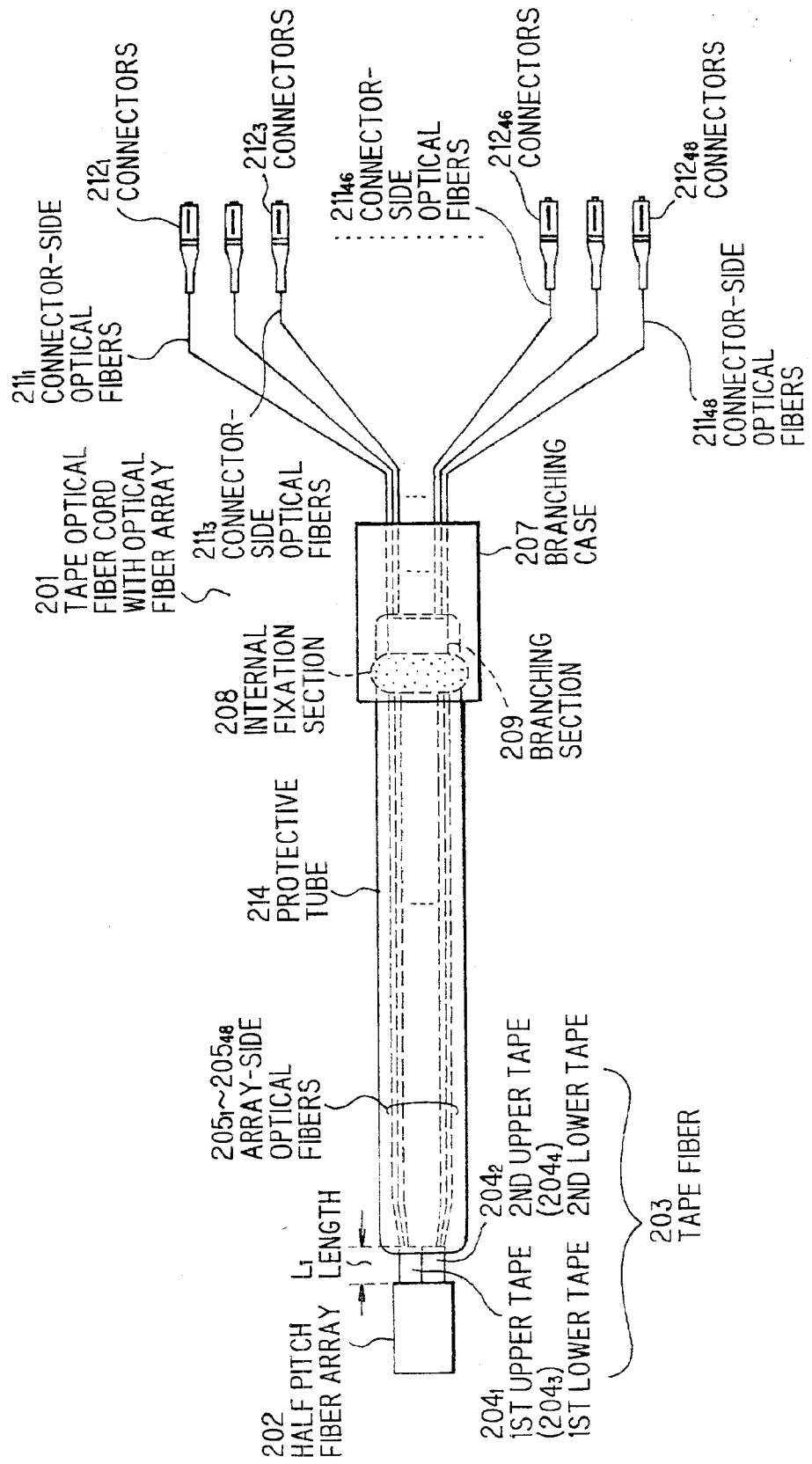
FIG. 8 is a top view of a tape optical fiber cord with an optical fiber array in a first preferred embodiment of the invention.

FIG. 8 shows a tape optical fiber cord with an optical fiber array in the first preferred embodiment of the invention. A tape optical fiber cord 201 with an optical fiber array has on its one end a half pitch fiber array 202 connected to an optical waveguide (not shown). One end of a tape fiber 203 in two columns of two stages is fixed to the half pitch fiber array 202. This tape fiber 203 comprises tapes arranged in two columns of two stages, i.e., a first upper tape $204_1$, a second upper tape $204_2$, a first lower tape $204_3$, and a second lower tape $204_4$ each comprising 12-core tape core. In FIG. 8, however, only the first upper tape $204_1$ and the second upper tape $204_2$ are shown, and two tapes of the first lower tape $204_3$ and the second lower tape $204_4$ are hidden respectively by the first upper tape $204_1$ and the second upper tape $204_2$ and are not shown.

The tape fiber 203 in its side fixed to the half pitch fiber array 202 is covered over a length L1, and, after that portion, the cover is not provided, and the fibers are separated one by one into array-side optical fibers $205_1$ to $205_{48}$. The other end of the array-side optical fibers $205_1$ to $205_{48}$ is inserted into a branching case 207. The tape fiber 203 is fixed in a fixation section 208 within the branching case 207 to the case. If necessary, the form of the fibers are returned to tapes $204_1$ to $204_4$, arranged in two columns of two stages, which are then connected to one end of a branching section 209. The branching section 209 has the same construction as the branching case 132 shown in FIG. 5 and are constructed so that the array-side optical fibers $205_1$ to $205_{48}$ arranged in the same manner as in the first upper tape $204_1$ to the second lower tape $204_4$ are rearranged in the order of the serial numbers from "1" to "48." One end of each of connector-side optical fibers $211_1$ to $211_{48}$ associated one by one with the array-side optical fibers $205_1$ to $205_{48}$ is connected to the other end of the branching section 209, and connectors $212_1$ to $212_{48}$ are connected respectively to the other end of these connector-side optical fibers $211_1$ to $211_{48}$.

In the tape optical fiber cord 201 with an optical fiber array in this first preferred embodiment, one end of a protective tube 214 is fixed to the fixation section 208 in the interior of the branching case 207. The protective tube 214 is formed of a tubular covering member which is somewhat larger than the whole size of the array-side optical fibers $205_1$ to $205_{48}$ so as to cover the array-side optical fibers $205_1$ to $205_{48}$ with the protective tube 214 while leaving a some space between the protective tube 214 and the array-side optical fibers $205_1$ to $205_{48}$, and the half pitch fiber array 202 side of the protective tube 214 is opened without being fixed. The protective tube 214 functions to protect the array-side optical fibers $205_1$ to $205_{48}$ in which the covering of the tape fiber 203 has been peeled off. Accordingly, the length of the protective tube 214 is set so as to cover the cover-peeled portion in the array-side optical fibers $205_1$ to $205_{48}$.

Figure 9:
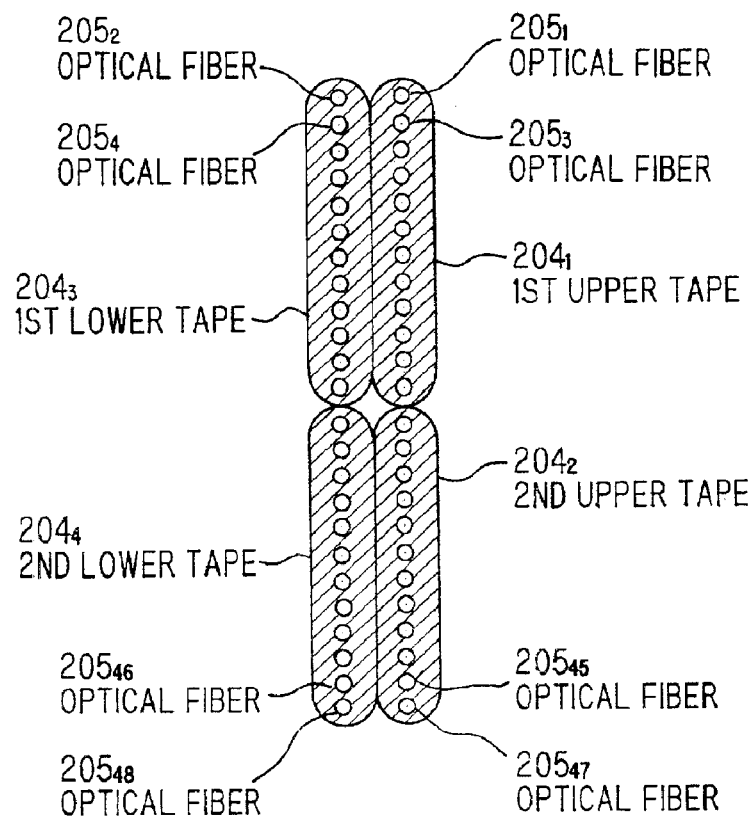
FIG. 9 is a cross-sectional view showing an arrangement structure of a tape portion in its site at which the tape is fixed to a half pitch fiber array.

FIG. 9 shows arrangement structure of a tape fiber in its site at which the tape is fixed to a half pitch fiber array. In this preferred embodiment, each of the four tapes of the first upper tape $204_1$, the second upper tape $204_2$, the first lower tape $204_3$, and the second lower tape $204_4$ comprises a 12-core tape core in which 12 optical fibers 205 are arranged in each tape. In this preferred embodiment, the pitch (spacing) of the optical fibers 205 in each of the tapes $204_1$ to $204_4$ is 250 $\mu$m.

Figure 10:
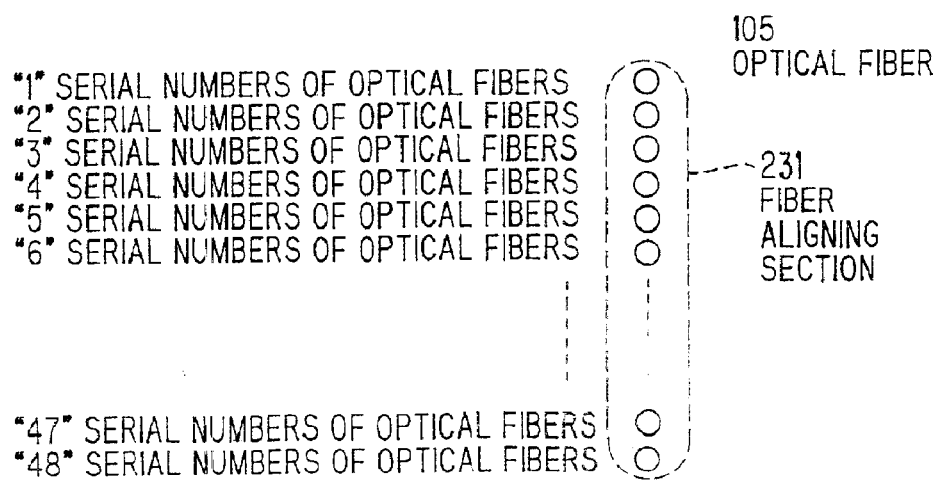
FIG. 10 is an explanatory view showing the arrangement of optical fibers in a fiber aligning section located on a fiber array side on the side of an optical waveguide (not shown)

FIG. 10 shows the arrangement of optical fibers in a fiber aligning section on the side of an optical waveguide (not shown). On the inlet side of the half pitch fiber array 202, 48 (in total) array-side optical fibers $205_1$ to $205_{48}$ constituting the fiber cord 201 with a half pitch fiber array shown in FIG. 8 are arranged as shown in FIG. 9. In the fiber aligning section 231 located on the opposite side of the inlet side, the optical fibers are arranged in one stage at a pitch of 127 $\mu$m. Thus, on the optical waveguide side, the arrangement structure is such that, in consideration of a demand for multi-channel and a reduction in size of devices, the pitch of output side waveguides has been reduced to the half of the pitch of the optical fibers 205 on the tapes $204_1$ to $204_4$ side, that is, the half pitch. The tape portion in the fiber cord 201 with a half pitch fiber array is constructed so that the tapes are arranged in two columns of two stages. Therefore, in a position before the fiber aligning section 231, the optical fibers 205 are taken out one by one from the upper stage and the lower stage by turns and are aligned in the fiber aligning section 231.

Figure 11:
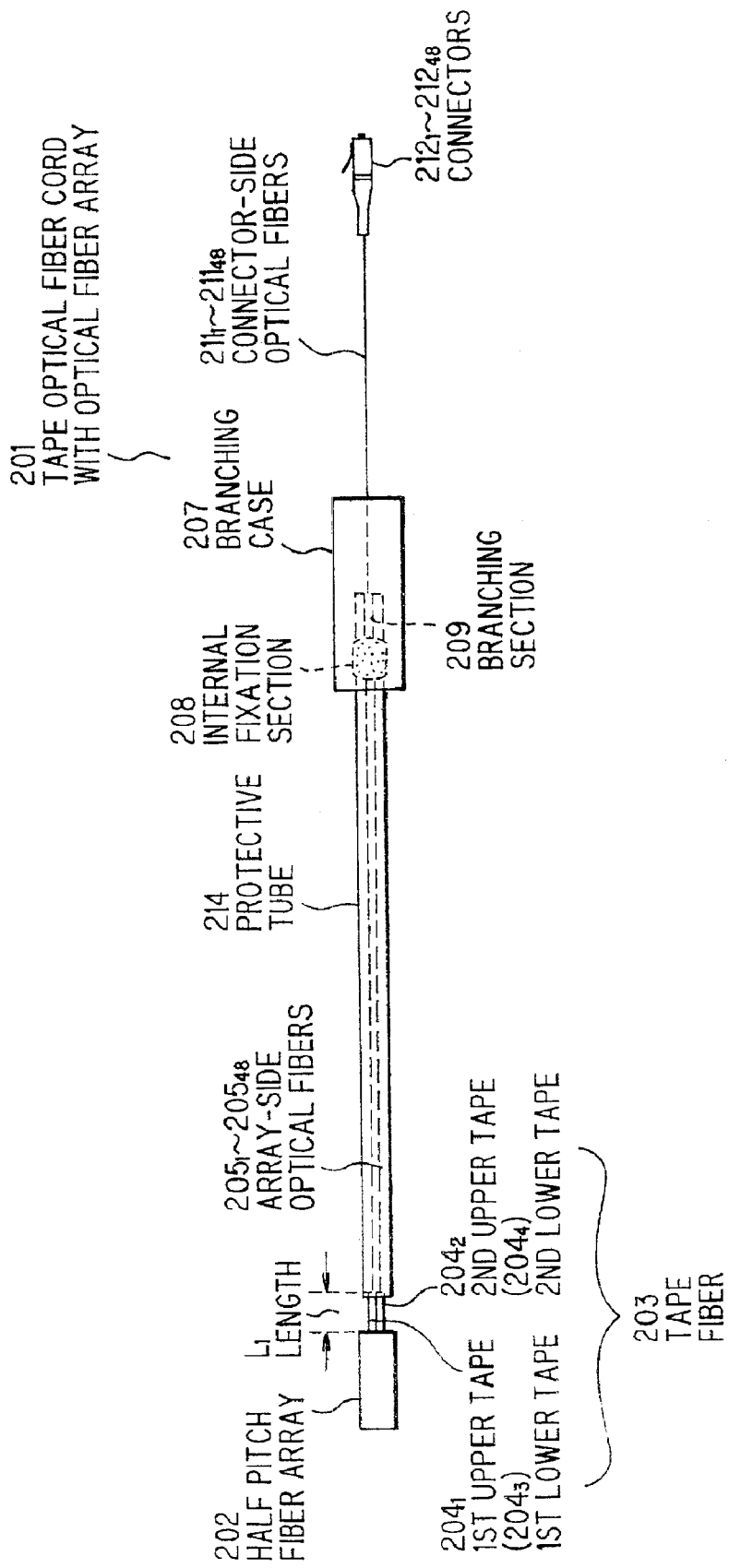
FIG. 11 is a side view of the fiber cord with a half pitch fiber array shown in FIG. 8.

FIG. 11 is a side view of the fiber cord with a half pitch fiber array shown in FIG. 8. In FIGS. 11 and 8, a branching case 207 is disposed at substantially the center portion of the tape optical fiber cord 201 with an optical fiber array. The construction, however, is not limited to this only. When the tape optical fiber cord 201 with an optical fiber array per se is relatively long, the distance from the branching case 207 to the half pitch fiber array 202 is in some cases relatively short. In this case, in only a portion around the end of the half pitch fiber array 202 side in the tapes of $204_1$ to $20_{44}$ arranged in two columns of two stages, the array-side optical fibers $20_{51}$ to $205_{48}$ are separated one by one, and this portion is covered with the covering tube 214. Specifically, as shown in FIGS. 8 and 11, in some cases, in a major part of the tape optical fiber cord 201 with an optical fiber array, the tapes $204_1$ to $20_4$ arranged in two columns of two stages are separated one by one into the array-side optical fibers $205_1$ to $205_{48}$, and, in another case, in only a small part of the tape optical fiber cord 201 with an optical fiber array, the tapes $204_1$ to $204_4$ arranged in two columns of two stages are separated one by one into the array-side optical fibers $205_1$ to $205_{48}$.

Likewise, in this preferred embodiment, the connector-side optical fibers $211_1$ to $211_{48}$ are separated one by one and delivered from the branching case 207, and the connectors $212_1$ to $212_{48}$ are connected respectively to the ends of these fibers. The construction, however, is not limited to this only. When the distance from the branching case 207 to the connectors $212_1$ to $212_{48}$ is long, a construction may be adopted wherein the tapes arranged in two columns of two stages are delivered from the branching case 207 and the connector-side optical fibers $211_1$ to $211_{48}$ are separated halfway one by one.

Figure 12:
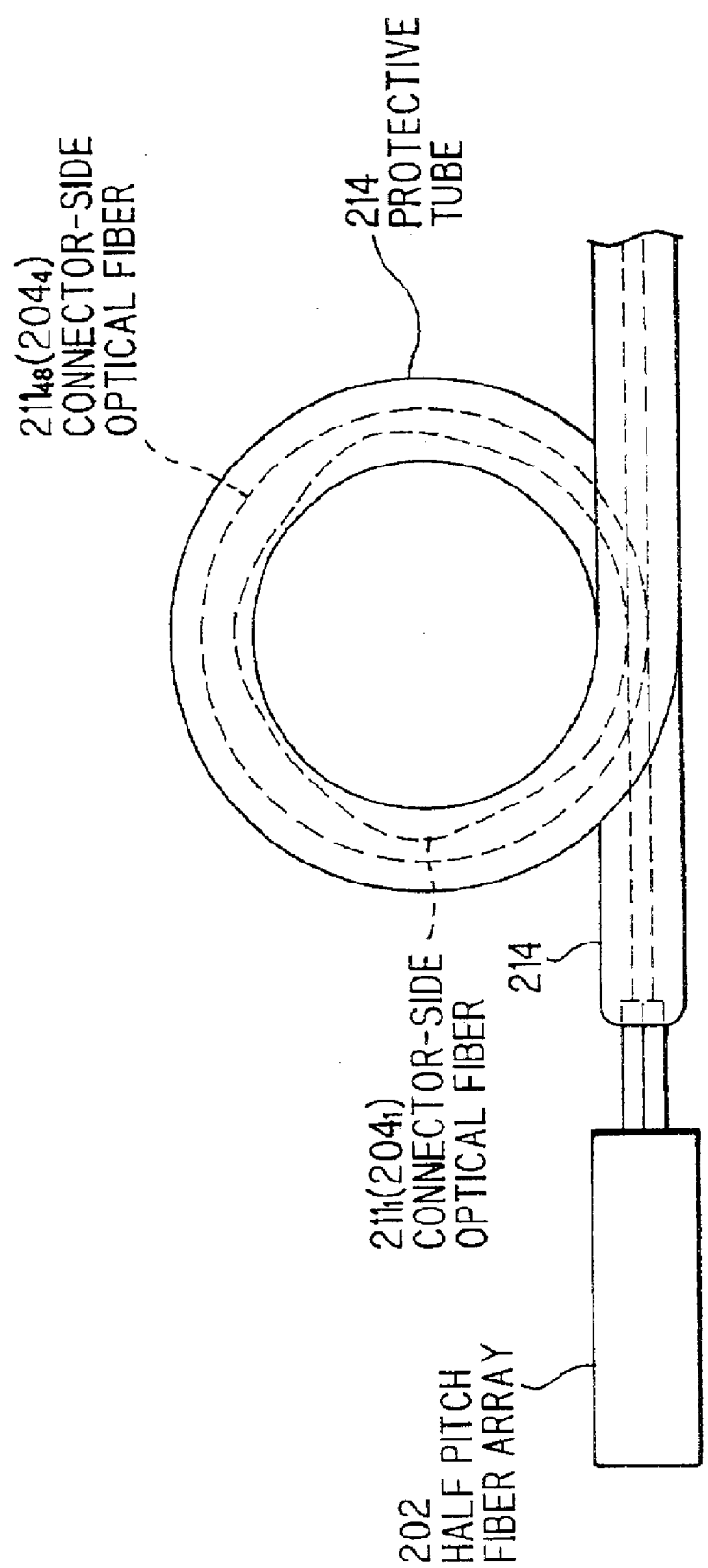
FIG. 12 is an enlarged explanatory view of a wound portion of the fiber cord with a half pitch fiber array in the first preferred embodiment.

FIG. 12 shows the behavior of optical fibers in the case where the fiber cord with a half pitch fiber array, in this preferred embodiment, in its portion around the branching case has been wound. Here, however, for easy understanding of the drawing, only two optical fibers, i.e., one connector-side optical fiber $211_1$ in the first upper tape $204_1$ and one connector-side optical fiber $211_{48}$ in the second lower tape $204_4$, are shown.

As shown in this drawing, when the protective tube 214 is wound so that the second lower tape $204_4$ side has a larger diameter, in this wound portion, the length of the connector-side optical fiber $211_1$ becomes larger than the length of the connector-side optical fiber $211_{48}$. However, both the connector-side optical fibers $211_1$ and $211_{48}$ can freely deform heir position within the protective tube 214 and can be flexed so as to draw a moderate wave to absorb the excess of the length. Therefore, even when the length of the connector-side optical fiber $211_1$ has become larger than the length of the connector-side optical fiber $211_{48}$, stress is not locally applied within the protective tube 214 and, thus, the occurrence of microbends can be effectively prevented.

<Second Preferred Embodiment>

Figure 13:
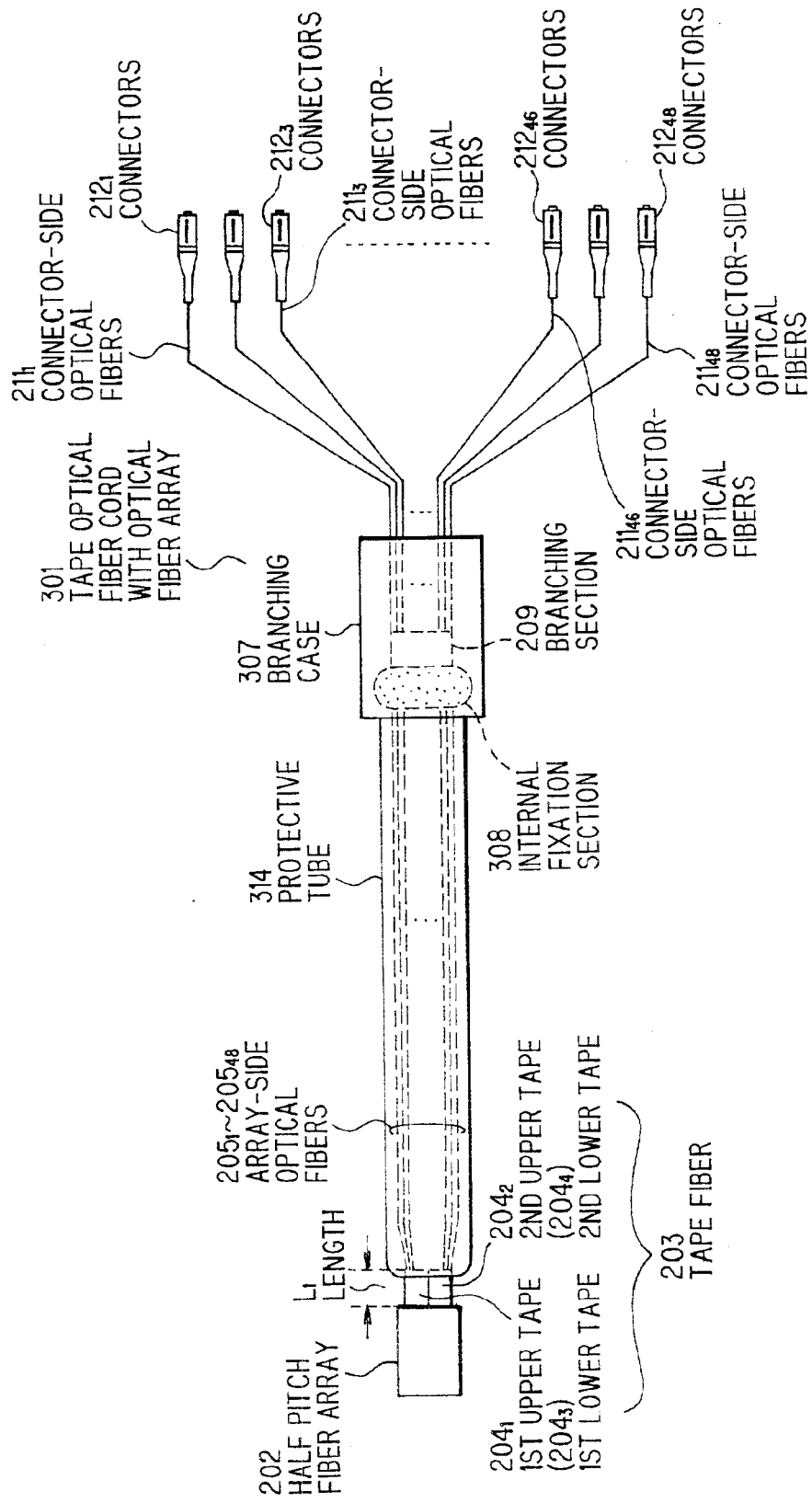
FIG. 13 is a top view of a tape optical fiber cord with an optical fiber array in a second preferred embodiment of the invention.
Figure 14:
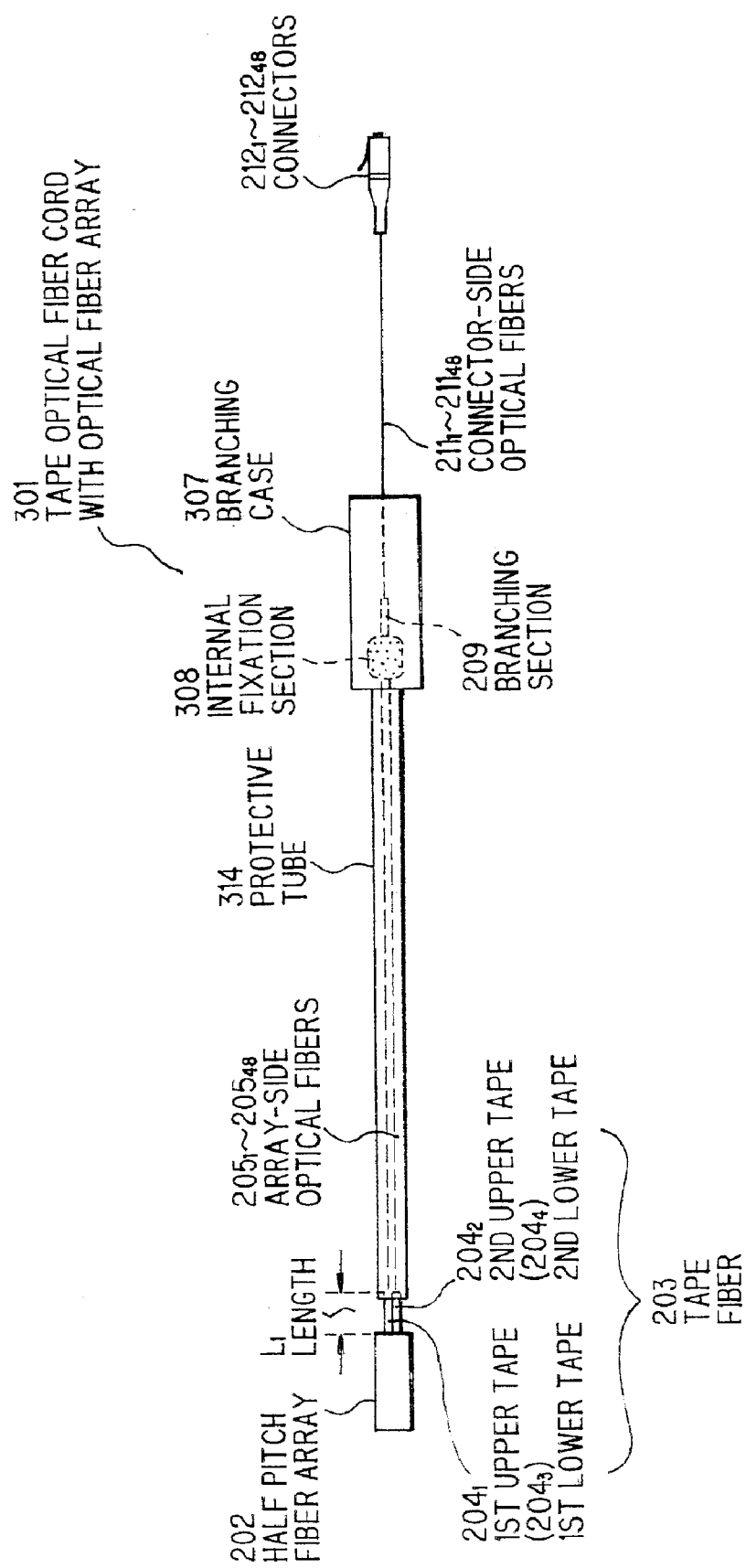
FIG. 14 is a side view of the tape optical fiber cord with an optical fiber array in the second preferred embodiment.

FIG. 13 is a top view of a tape optical fiber cord with an optical fiber array in the second preferred embodiment of the invention, and FIG. 14 a side view of the tape optical fiber cord with an optical fiber array in the second preferred embodiment. In FIGS. 8, 13, and 14, like parts are identified with the same reference numerals, and the overlapped explanation thereof will be omitted. A tape optical fiber cord 301 with an optical fiber array in this second preferred embodiment has on its one end a half pitch fiber array 202. The tape optical fiber cord 301 with an optical fiber array comprises four tapes arranged in two columns of two stages, i.e., a first upper tape $204_1$, a second upper tape $204_2$, a first lower tape $204_3$, and a second lower tape $204_4$ each comprising 12-core tape core. In FIG. 13, however, as with FIG. 8, only the first upper tape $204_1$ and the second upper tape $204_2$ are shown.

The tape fiber 203 in its side fixed to the half pitch fiber array 202 is covered over a length L1 and comprises tapes $204_1$ to $204_4$ arranged in two columns of two stages, and, after that portion, the cover is not provided, and the fibers are separated one by one into array-side optical fibers $205_1$ to $205_{48}$. The other end of the array-side optical fibers $205_1$ to $205_{48}$ is inserted into a branching case 307. The tape fiber 203 is fixed in a fixation section 308 within the branching case 307 directly to the case. If necessary, the form of the fibers are returned to tapes $204_1$ to $204_4$ and arranged in two columns of two stages, which are then connected to one end of a branching section 209. One end of each of connector-side optical fibers $211_1$ to $211_{48}$ associated one by one with the array-side optical fibers $205_1$ to $205_{48}$ is connected to the other side of the branching section 209, and connectors $212_1$ to $212_{48}$ are connected respectively to the other end of these connector-side optical fibers $211_1$ to $211_{48}$.

In the tape optical fiber cord 201 with an optical fiber array in this second preferred embodiment, one end of a protective tube 314 is fixed to the branching case 307 in its end on the half pitch fiber array 202 side. The length of the protective tube 314 is set so as to cover the cover-peeled portion in the array-side optical fibers $205_1$ to $205_{48}$. The branching case 307 may be identical to the branching case 207 in the first preferred embodiment. In this preferred embodiment, however, a protective tube is used wherein the size of the tube has been reduced by a length created from the fact that the protective tube 314 has not been inserted into the branching case.

In this second preferred embodiment, one end of the protective tube 314 is fixed to the end of the branching case 307. Alternatively, the protective tube 314 may not be fixed to the branching case 307 per se, and, instead, may be fixed with an adhesive or the like to the array-side optical fibers $205_1$ to $205_{48}$ only in their predetermined portion, for example, around the end of the branching case 307. In this case, the protective tube 314 is not necessarily fixed to all the array-side optical fibers $205_1$ to $205_{48}$ and may be fixed to a part of the array-side optical fibers $205_1$ to $205_{48}$.

<Third Preferred Embodiment>

Figure 15:
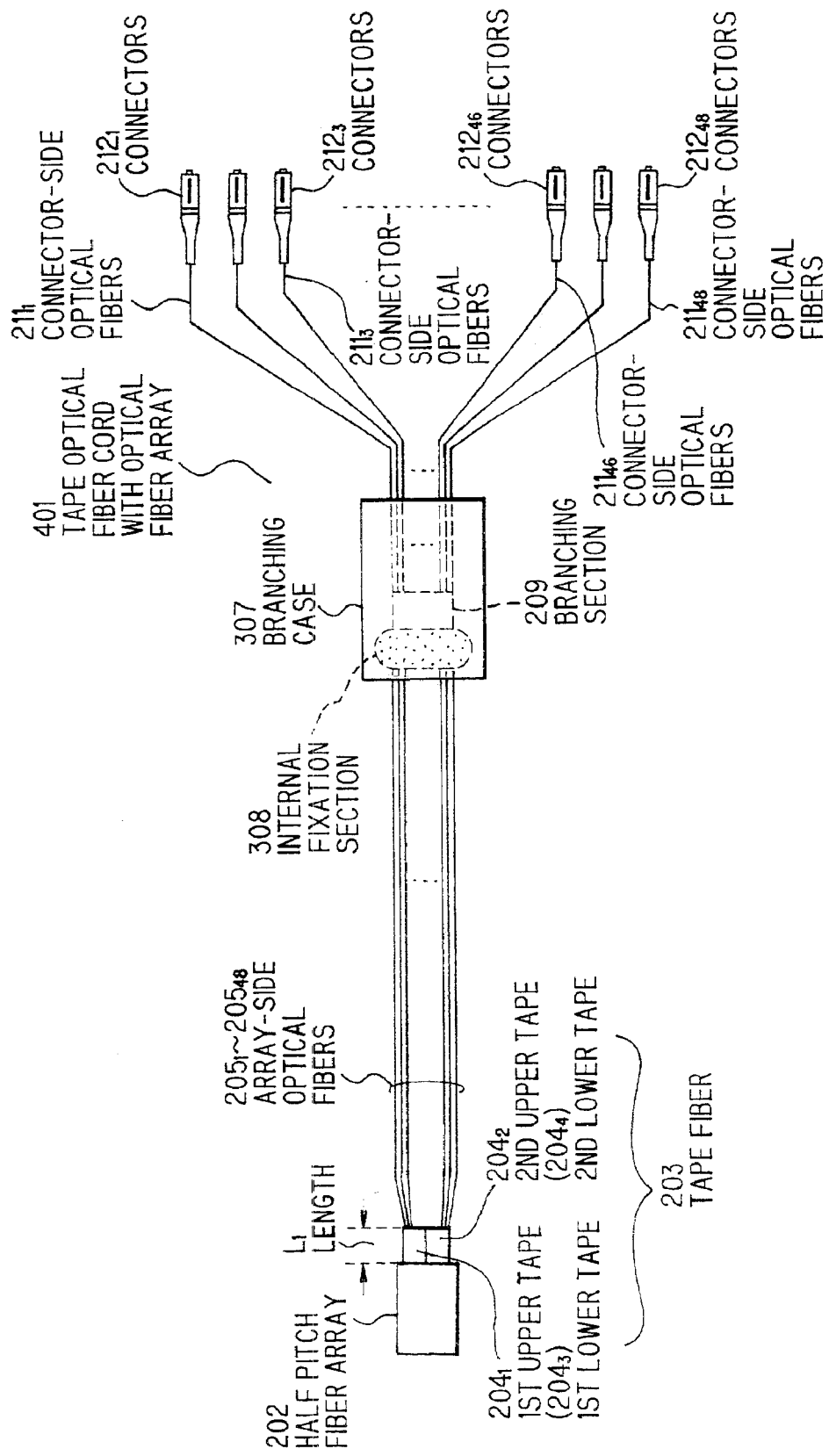
FIG. 15 is a top view of a tape optical fiber cord with an optical fiber array in a third preferred embodiment of the invention.
Figure 16:
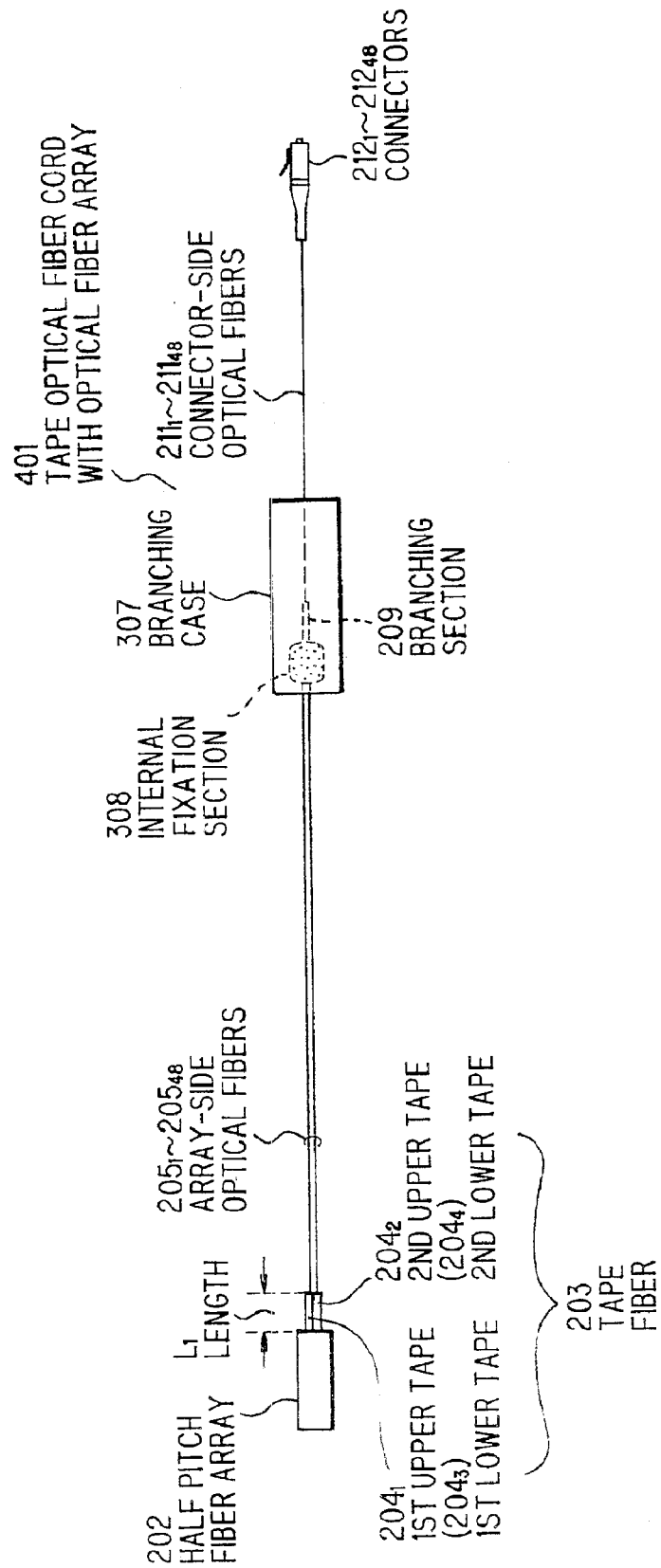
FIG. 16 is a side view of the tape optical fiber cord with an optical fiber array in the third preferred embodiment.

FIG. 15 is a top view of a tape optical fiber cord with an optical fiber array in the third preferred embodiment of the invention, and FIG. 16 a side view of the tape optical fiber cord with an optical fiber array in the third preferred embodiment. In FIGS. 8, 13, 15 and 16, like parts are identified with the same reference numerals, and the overlapped explanation thereof will be omitted. A tape optical fiber cord 401 with an optical fiber array in this third preferred embodiment is the same as the tape optical fiber cord 301 with an optical fiber array in the second preferred embodiment, except that the protective tube 314 is not provided. Accordingly, the array-side optical fibers $205_1$ to $205_{48}$ are fixed as a bundle of the array-side optical fibers $205_1$ to $205_{48}$ or as the tape fiber 203 comprising the tapes $204_1$ to $204_4$ arranged in two columns of two stages, in the fixation section 308 within the branching case 307, directly to the case.

Thus, in the tape optical fiber cord 401 with an optical fiber array in the third preferred embodiment, the array-side optical fibers $205_1$ to $205_{48}$ are separated one by one in a limited section between the half pitch fiber array 202 and the branching case 307. Further, since the protective tube 314 shown in FIG. 13 is not provided, the array-side optical fibers $205_1$ to $205_{48}$ can be more freely flexed one by one. Therefore, any large force is not locally applied to these optical fibers. This can more effectively prevent the occurrence of microbends.

<Fourth Preferred Embodiment>

Figure 17:
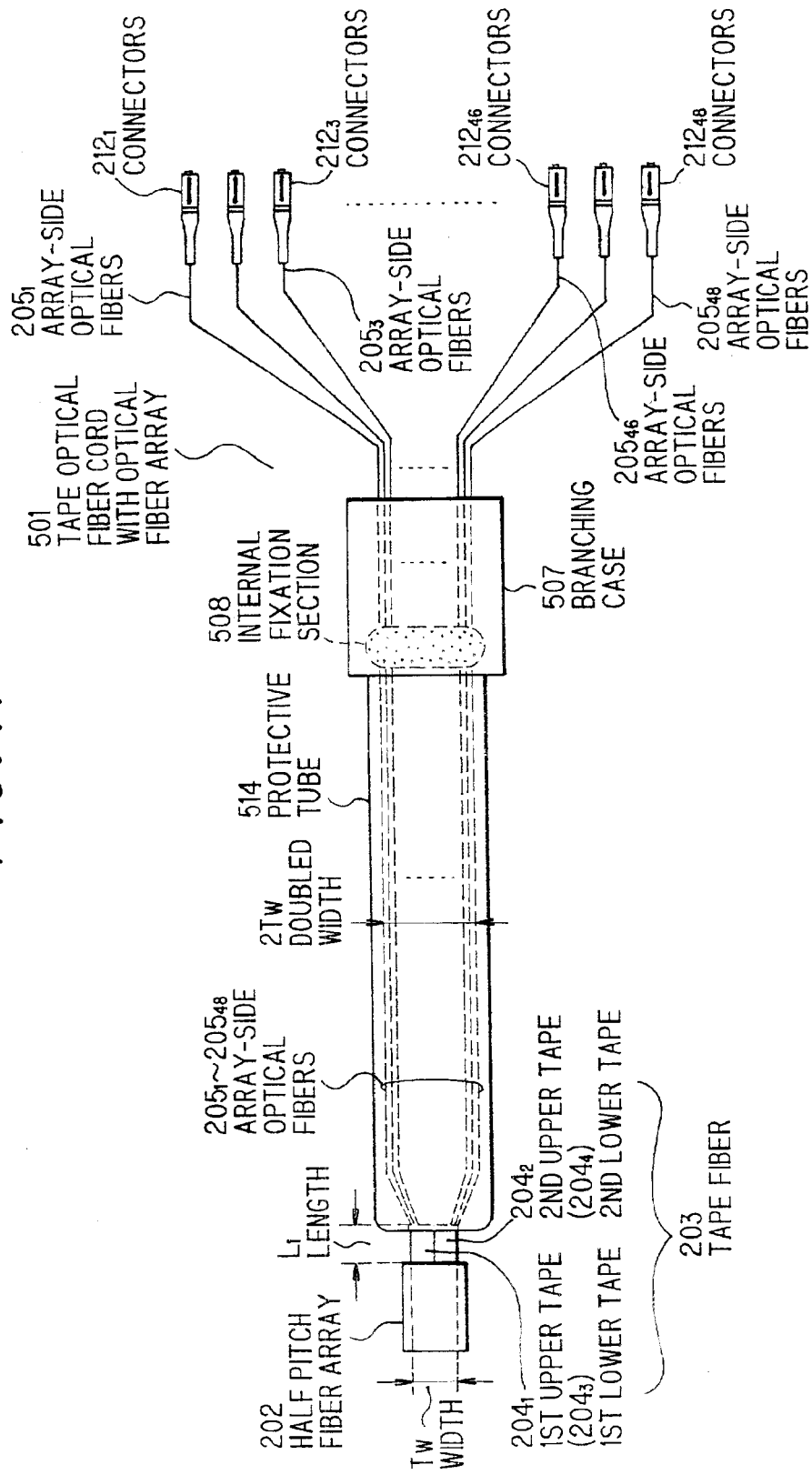
FIG. 17 is a top view of a tape optical fiber cord with an optical fiber array in a fourth preferred embodiment of the invention.
Figure 18:
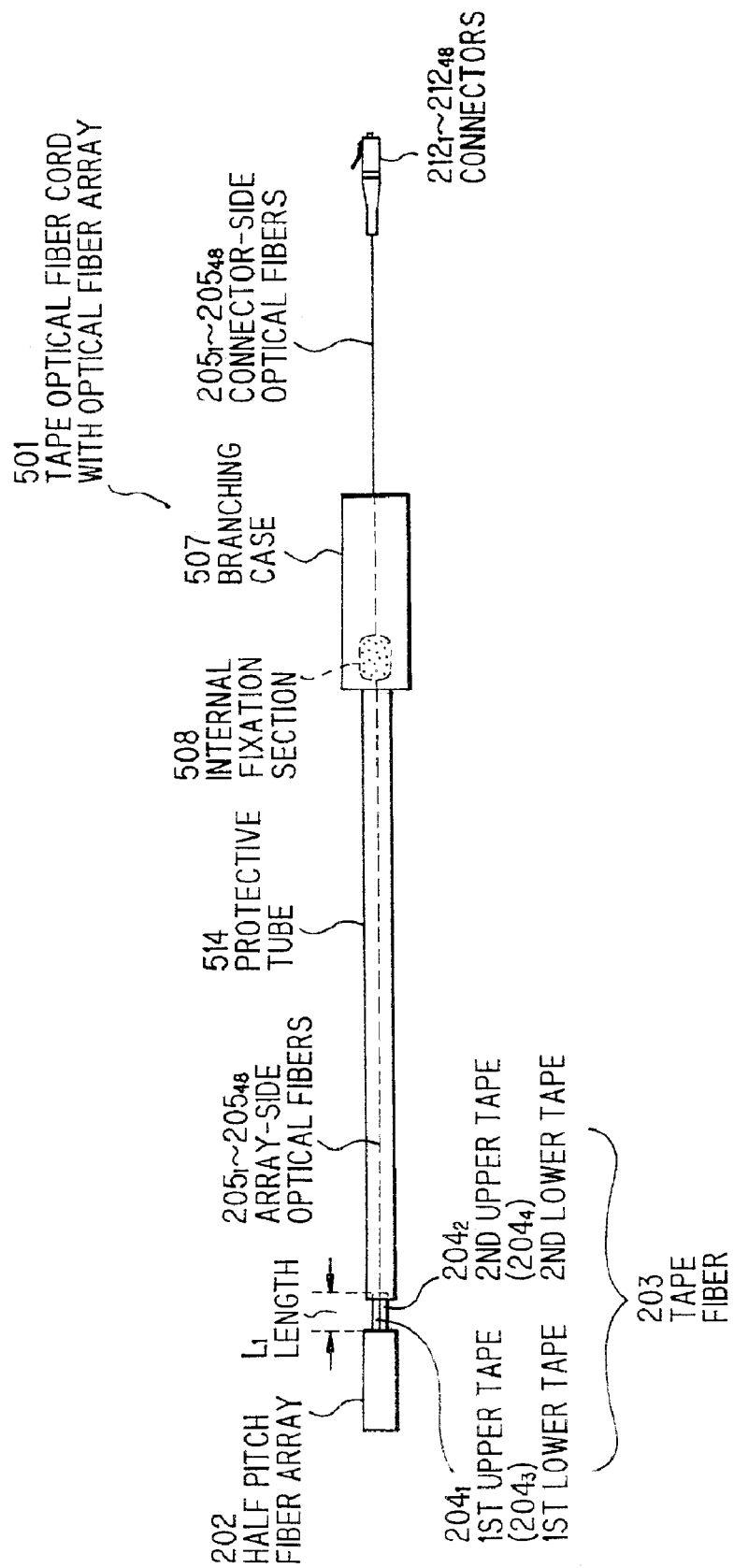
FIG. 18 is a side view of the tape optical fiber cord with an optical fiber array in the fourth preferred embodiment.

FIG. 17 is a top view of a tape optical fiber cord with an optical fiber array in the fourth preferred embodiment of the invention, and FIG. 18 a side view of the tape optical fiber cord with an optical fiber array in the fourth preferred embodiment. In FIGS. 8, 17, and 18, like parts are identified with the same reference numerals, and the overlapped explanation thereof will be omitted. In a tape optical fiber cord 501 with an optical fiber array in the fourth preferred embodiment, the fibers in the tape fiber 203, comprising tapes arranged in two columns of two stages, in its end remote from the end fixed to the half pitch fiber array 202 are separated one by one as array-side optical fibers $205_1$ to $205_{48}$. In this case, these array-side optical fibers $205_1$ to $205_{48}$ are rearranged in one stage by taking out the optical fibers one by one from the first upper tape $204_1$ and the first lower tape $204_3$ by turns and arranging these optical fibers in the same manner as described above in connection with the arrangement of the fibers in one stage in the fiber aligning section 231 shown in FIG. 10 and, likewise, taking out the optical fibers one by one from the second upper tape $204_2$ and the second lower tape $204_4$ by turns and arranging these optical fibers. Therefore, assuming that the spacings among the optical fibers are identical to one another, the whole width of the array-side optical fibers $205_1$ to $205_{48}$, which have been separated one by one and have been arranged in one stage, is twice, i.e., 2Tw, the width Tw of the two-stage portion. That is, the width in the portion is about twice the width in the same portion in the first preferred embodiment shown in FIG. 8.

It is a matter of course that the spacing among the optical fibers (pitch) in the large width portion which has been changed to a one stage construction may be made smaller than the spacings among the optical fibers (pitch) in the two-stage portion. In this case, the width in the one-stage portion can be brought to substantially the same value as the width Tw in the two-stage portion.

As described above in connection with the preferred embodiment shown in FIG. 17, when the whole width of the array-side optical fibers $205_1$ to $205_{48}$ is increased, the width of the branching case 507 should be increased. The array-side optical fibers $205_1$ to $205_{48}$ are fixed in a fixation section 508 within the branching case 507 to the case. In this preferred embodiment, the array-side optical fibers $205_1$ to $205_{48}$ have already been changed to a one-stage construction and are arranged from "1" to "48" in an ascending order. Therefore, the inside of the branching case 507 is hollow, and, unlike the branching section 209 in the first preferred embodiment, any device for rearrangement of the fibers is not provided. In this preferred embodiment, the array-side optical fibers $205_1$ to $205_{48}$ are passed through the branching case 507, and connectors $212_1$ to $212_{48}$ are connected respectively to the ends of the fibers.

Figure 1:
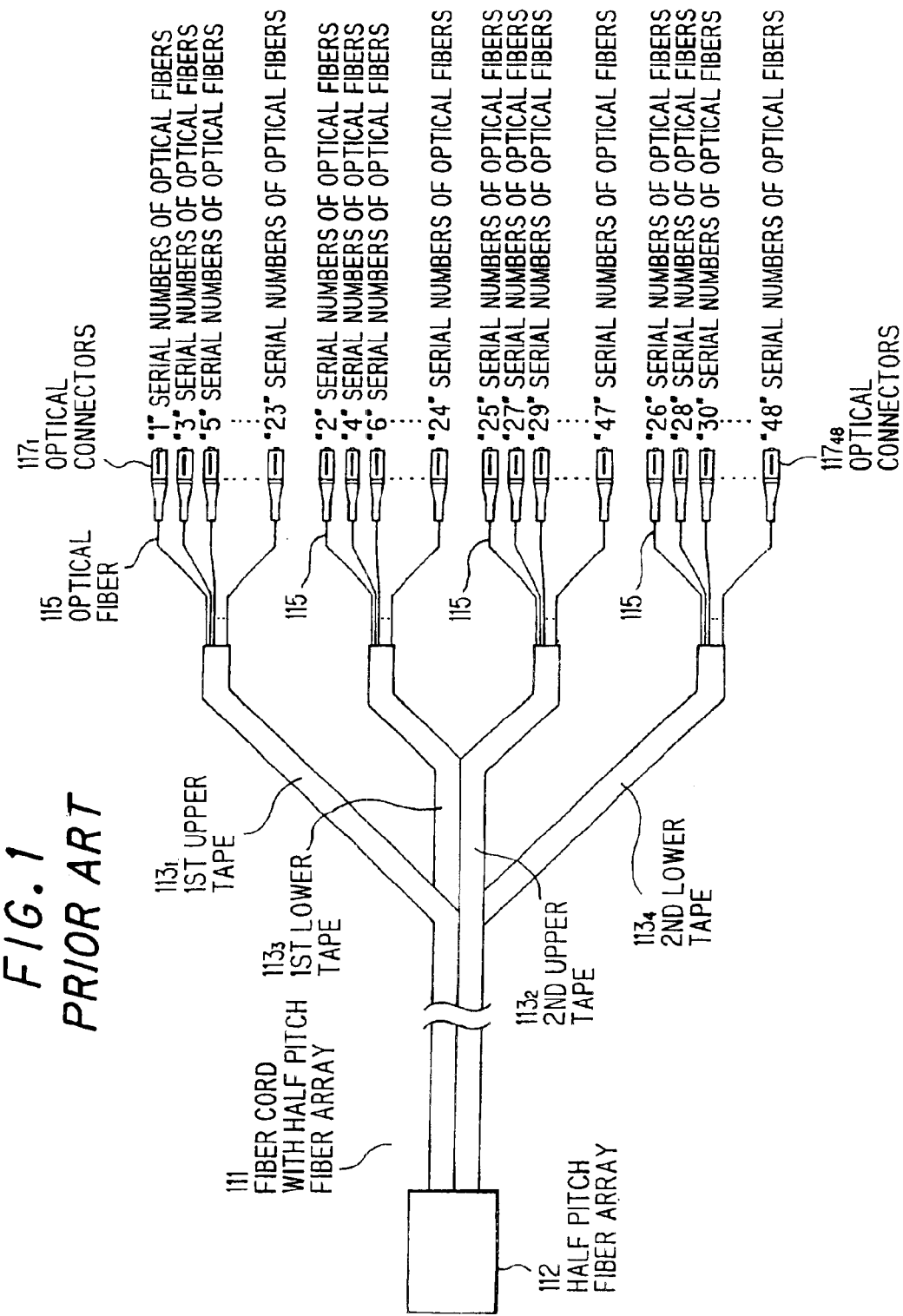
FIG. 1 is a plan view showing an example of the conventional fiber cord with a half pitch fiber array.
Figure 2:
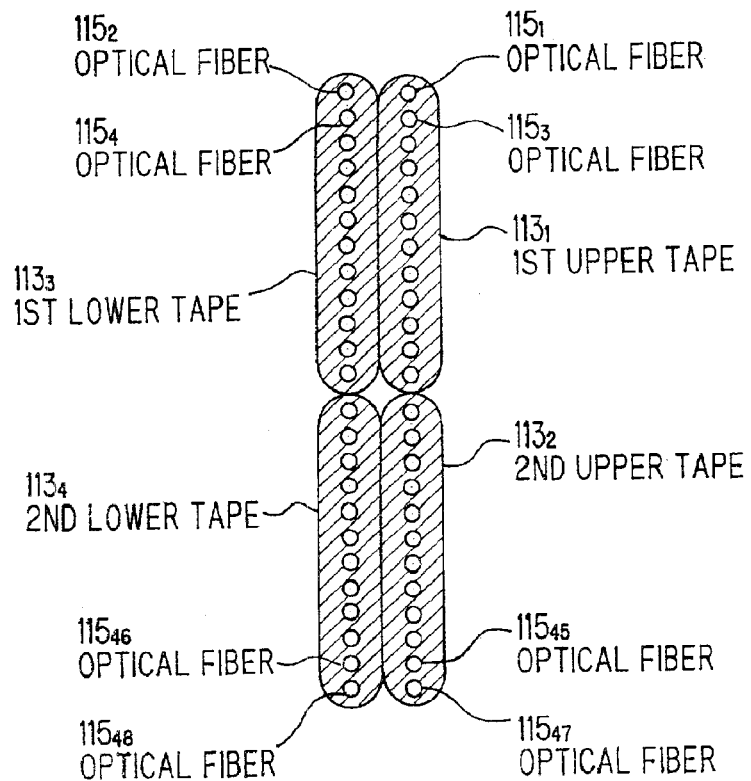
FIG. 2 is a cross-sectional view of the center portion of the fiber cord with a half pitch fiber array shown in FIG. 1.
Figure 3:
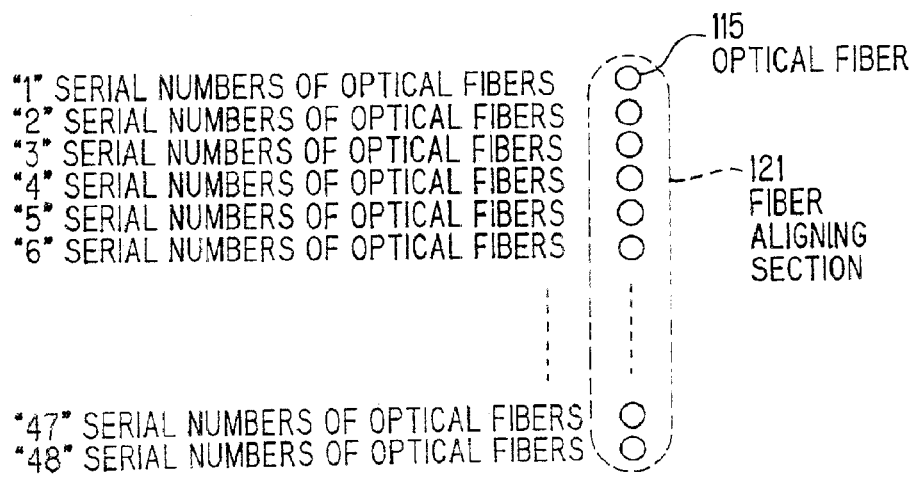
FIG. 3 is a plan view showing the arrangement of optical fibers in a fiber aligning section on the side of the conventional fiber array.
Figure 4:
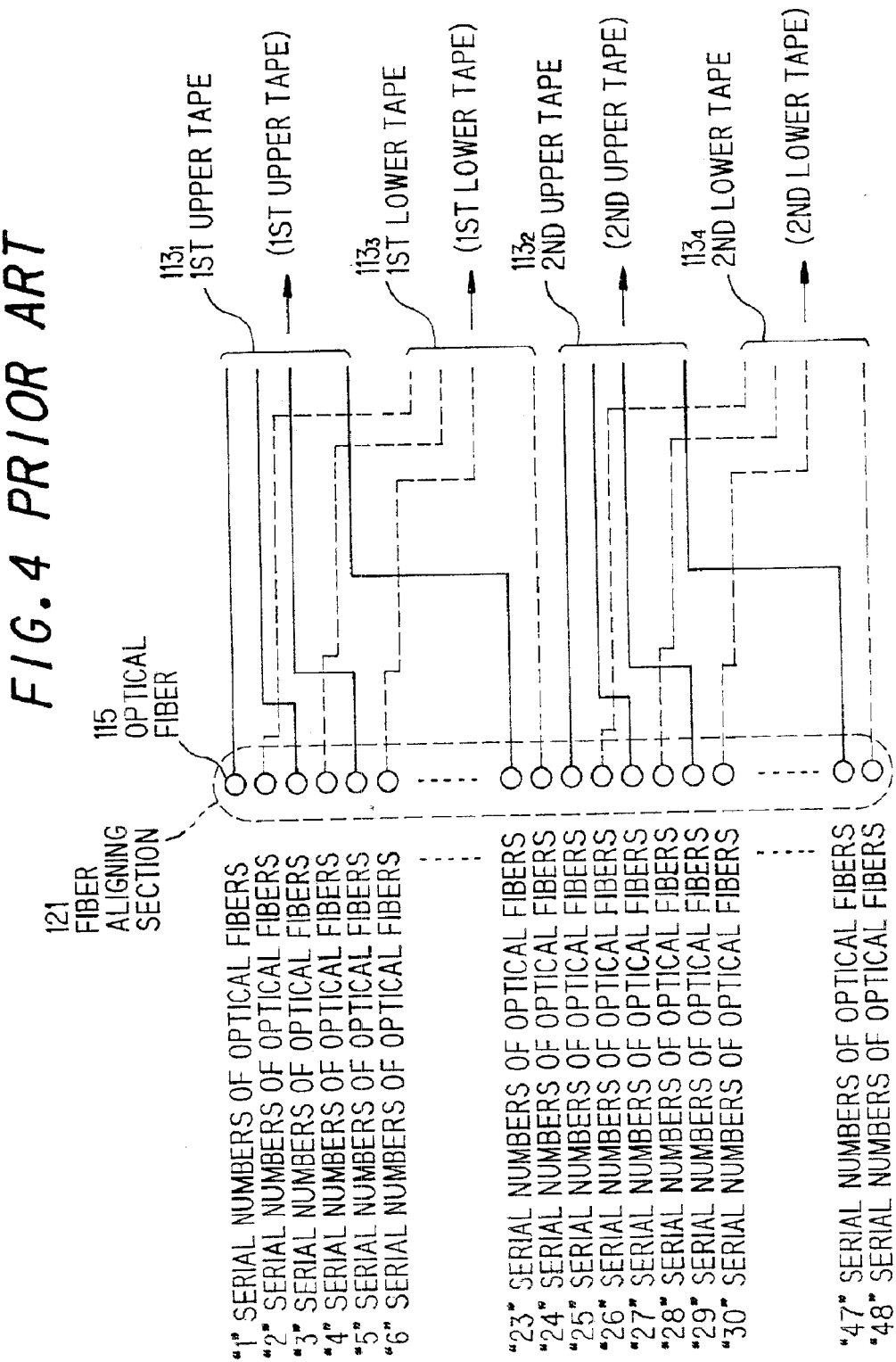
FIG. 4 is an explanatory view showing the rearrangement of the individual fibers in the fiber array shown in FIG. 1.
Figure 5:
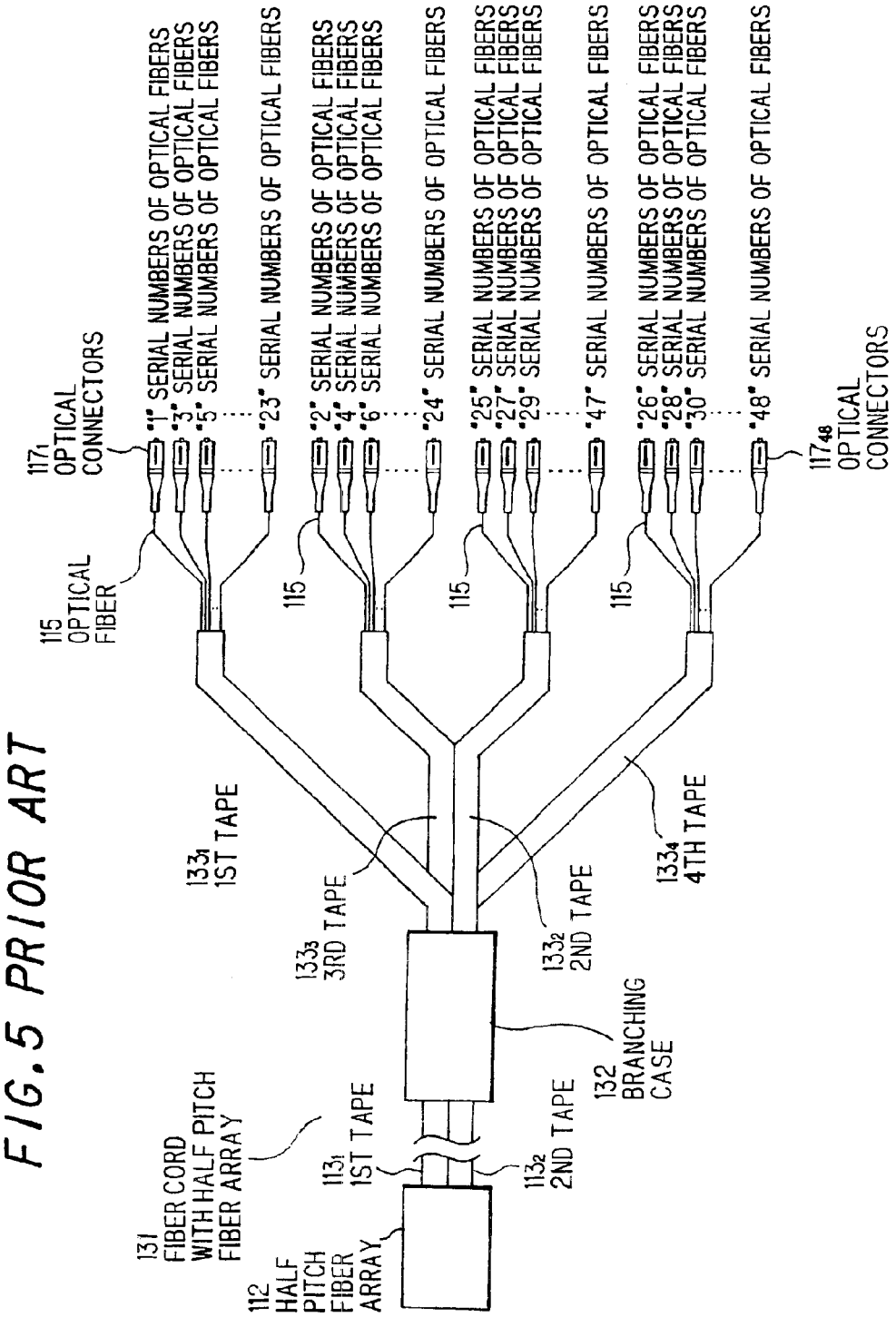
FIG. 5 is a plan view showing an example of the conventional fiber cord with a half pitch fiber array provided with a branching case.
Figure 6:
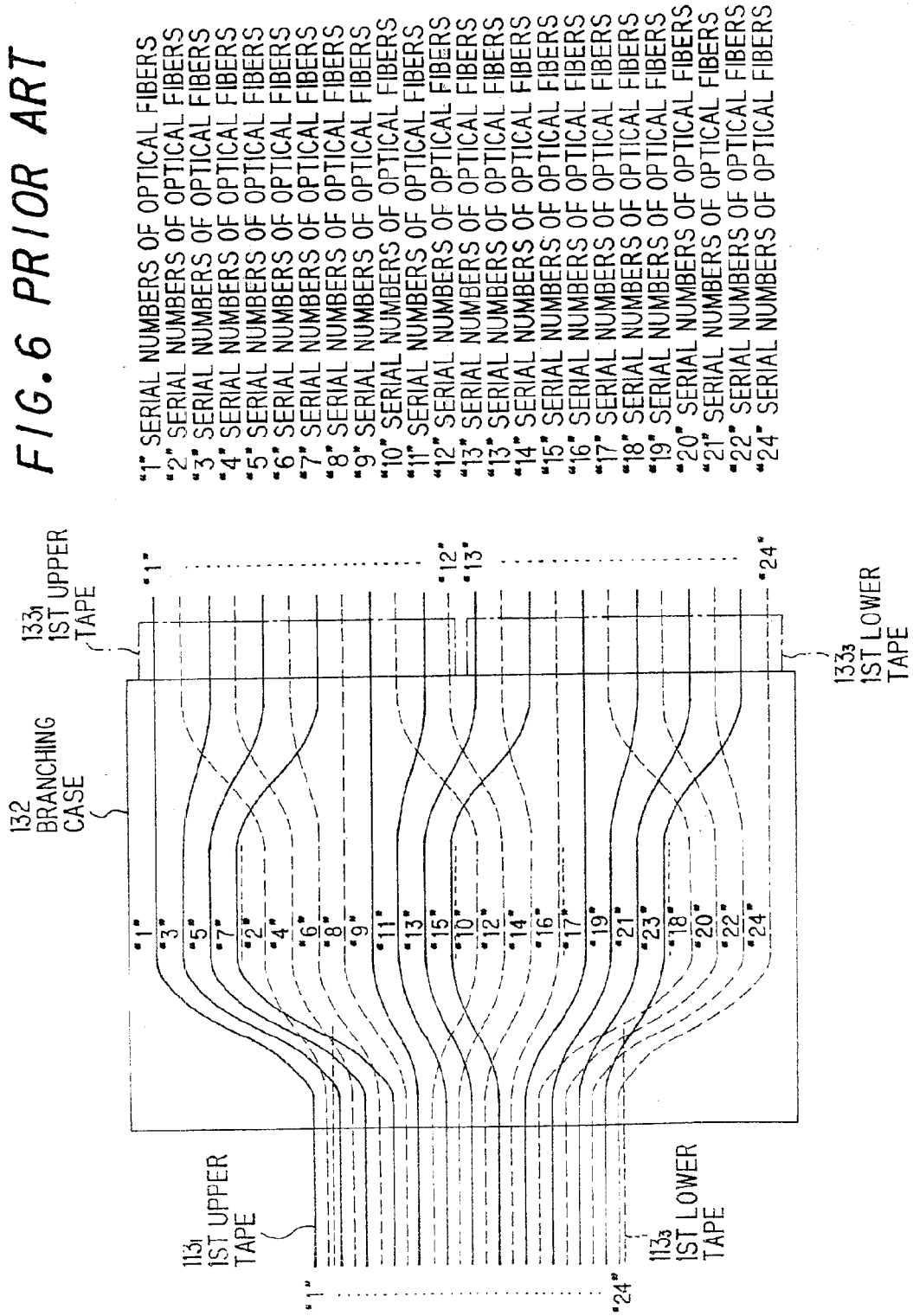
FIG. 6 is an explanatory view showing a part of wiring within the branching case shown in FIG. 5.
Figure 7:
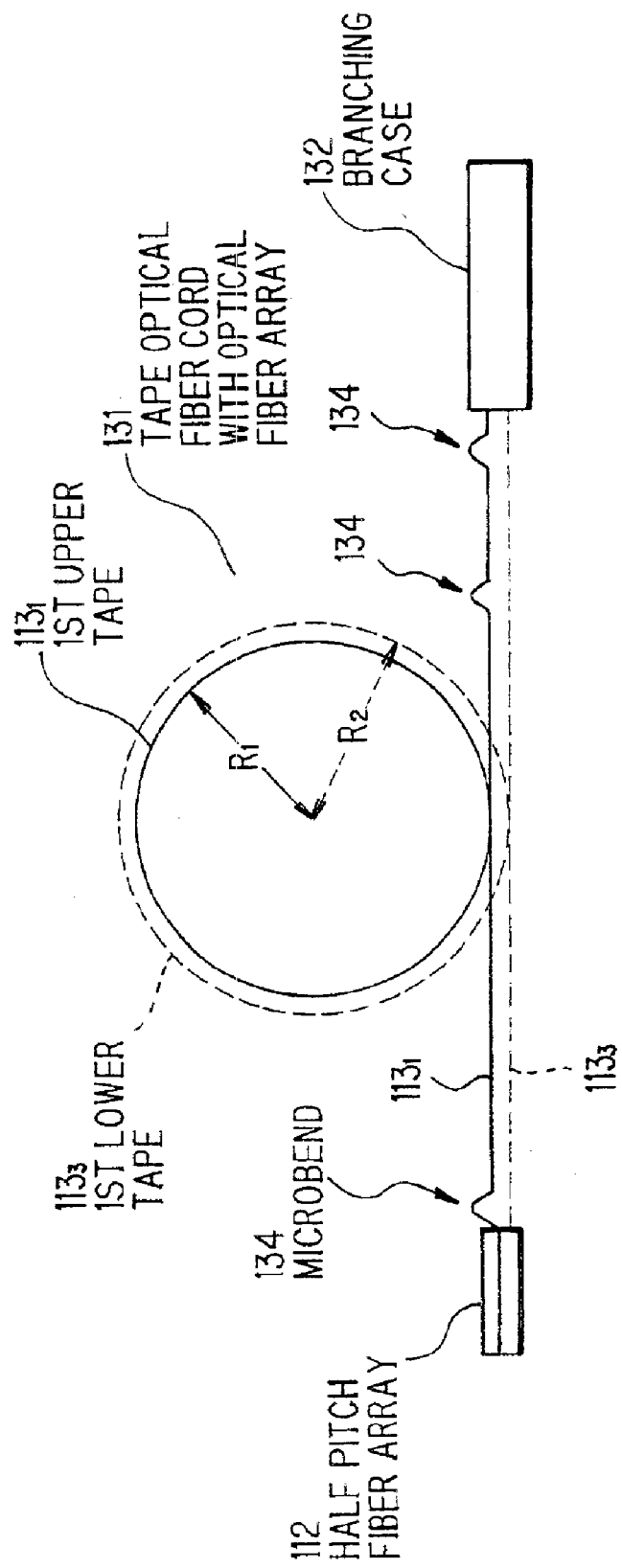
FIG. 7 is an explanatory view showing the occurrence of microbends in the conventional tape optical fiber cord with an optical fiber array using a branching case.

In some tape optical fiber cord 501 with an optical fiber array, the distance between the branching case 507 and the connectors $212_1$ to $212_{48}$ is relatively long. In this case, when the array-side optical fibers $205_1$ to $205_{48}$ are in the state of being separated one by one on the outlet side of the branching case 507, there is a fear that it is difficult to confirm the order of the fibers. When the above fear exists, as shown in FIG. 5, a method may be adopted wherein tapes arranged, for example, in two columns of two stages are delivered from the branching case 507, and, at a position near the connectors $212_1$ to $212_{48}$, the fibers are separated one by one. When this method is adopted, a branching section for changing the arrangement of the array-side optical fibers $205_1$ to $205_{48}$ should be provided within the branching case 507.

In this preferred embodiment, one end of the protective tube 514 is fixed to the branching case 507 in its end on the half pitch fiber array 202 side. The other end of the protective tube 514 is extended to a portion near the half pitch fiber array 202. In this case, as with the above preferred embodiment, the other end of the protective tube 514 is not fixed to the half pitch fiber array 202.

<Fifth Preferred Embodiment>

Figure 19:
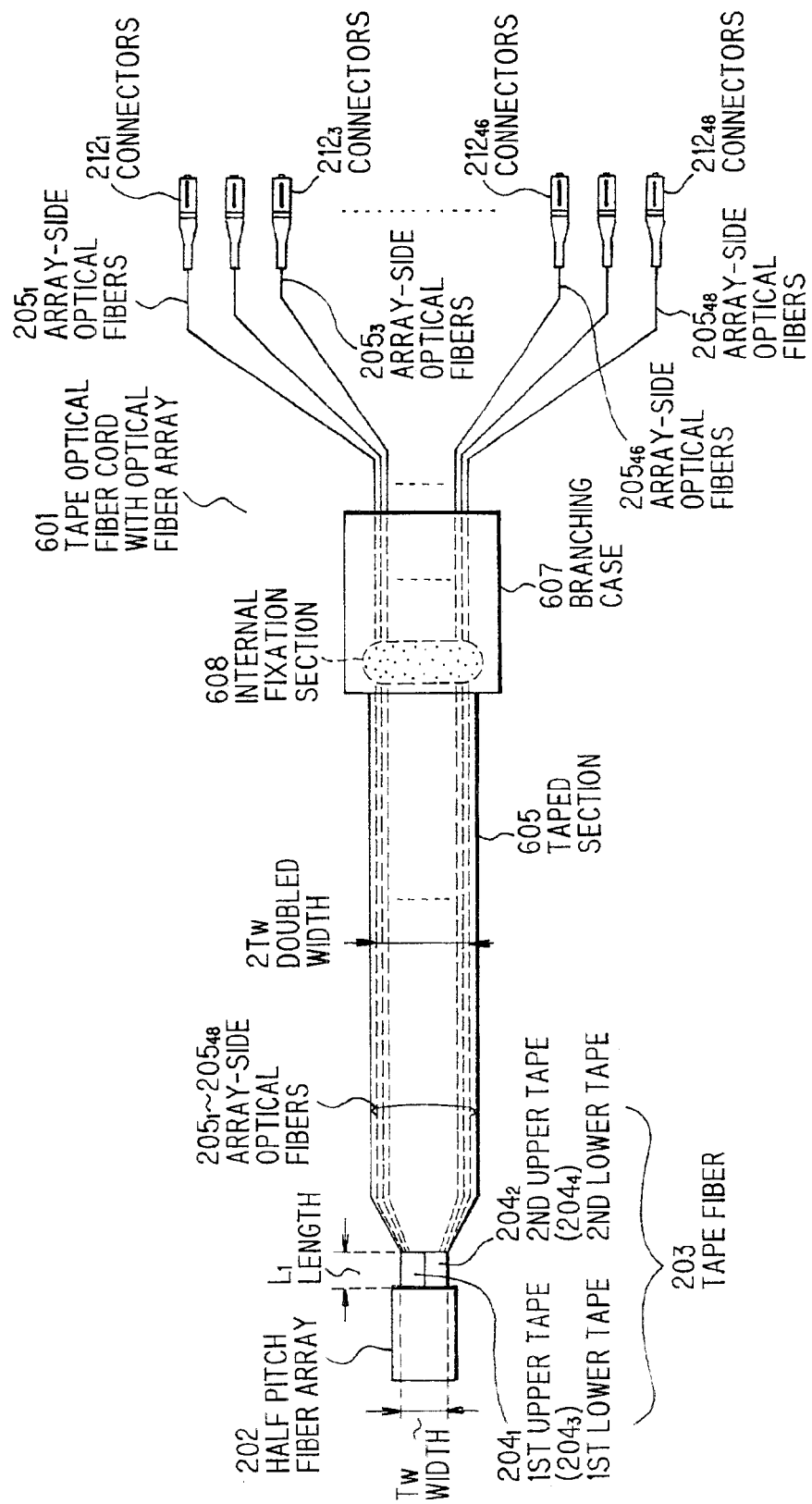
FIG. 19 is a top view of a tape optical fiber cord with an optical fiber array in a fifth preferred embodiment of the invention.
Figure 20:
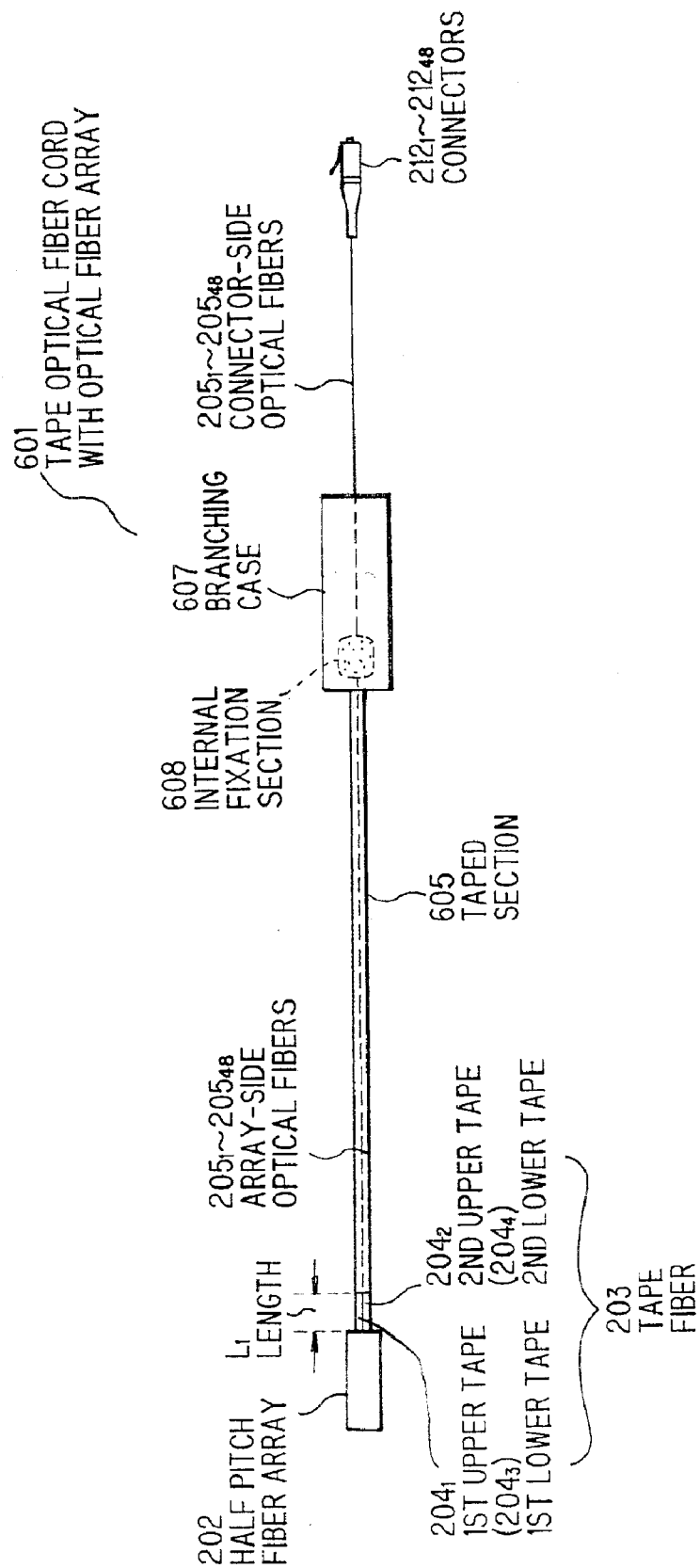
FIG. 20 is a side view of the tape optical fiber cord with an optical fiber array in the fifth preferred embodiment.

FIG. 19 is a top view of a tape optical fiber cord with an optical fiber array in the fifth preferred embodiment of the invention, and FIG. 20 a side view of the tape optical fiber cord with an optical fiber array in the fifth preferred embodiment. In FIGS. 8, 17, 19, and 20, like parts are identified with the same reference numerals, and the overlapped explanation thereof will be omitted. In the tape optical fiber cord 601 with an optical fiber array in the fifth preferred embodiment, as with the tape optical fiber cord 501 with an optical fiber array in the fourth preferred embodiment, the fibers in the tape fiber 203, comprising tapes arranged in two columns of two stages, in its end remote from the end fixed to the half pitch fiber array 202 are separated one by one as array-side optical fibers $205_1$ to $205_{48}$. In this connection, it should be noted that, in the fourth preferred embodiment, the array-side optical fibers $205_1$ to $205_{48}$, which have been separated one by one, are covered with the protective tube 514 (see FIG. 17), whereas, in this preferred embodiment, the fibers, which have been changed to a one-stage construction, as such are coated with a resin to prepare a tape 605.

The other end of the tape 605 is fixed in a fixation section 608 within a branching case 607 to the case 607. In this preferred embodiment, the array-side optical fibers $205_1$ to $205_{48}$ in the tape 605 have already been changed to a one-stage construction and are arranged from "1" to "48" in an ascending order. Therefore, the inside of the branching case 607 is hollow, and, unlike the branching section 209 in the first preferred embodiment, any device for rearrangement of the fibers is not provided. In this preferred embodiment, the tape 605 is passed through the branching case 507, the fibers in the tape are separated at a desired site into the array-side optical fibers $205_1$ to $205_{48}$, and connectors $212_1$ to $212_{48}$ are connected respectively to the ends of the fibers.

It is a matter of course that a construction may be adopted that the tape 605 is again brought to the tape fiber 203, comprising tapes arranged in two columns of two stages, within the branching case 607, and the tape fiber 203 is then connected to the branching section 209 shown in FIG. 8.

<Sixth Preferred Embodiment>

Figure 21:
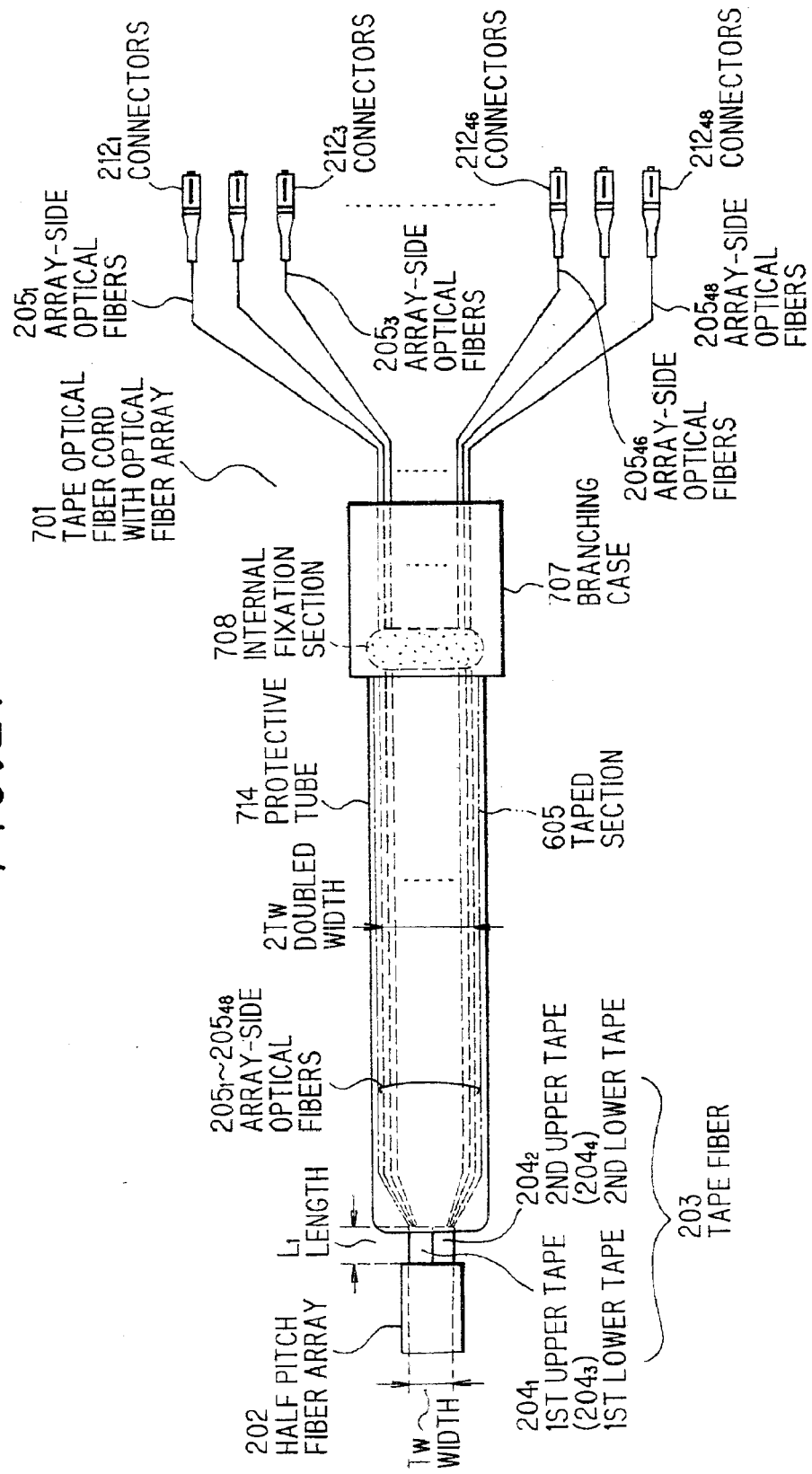
FIG. 21 is a top view of a tape optical fiber cord with an optical fiber array in a sixth preferred embodiment of the invention.
Figure 22:
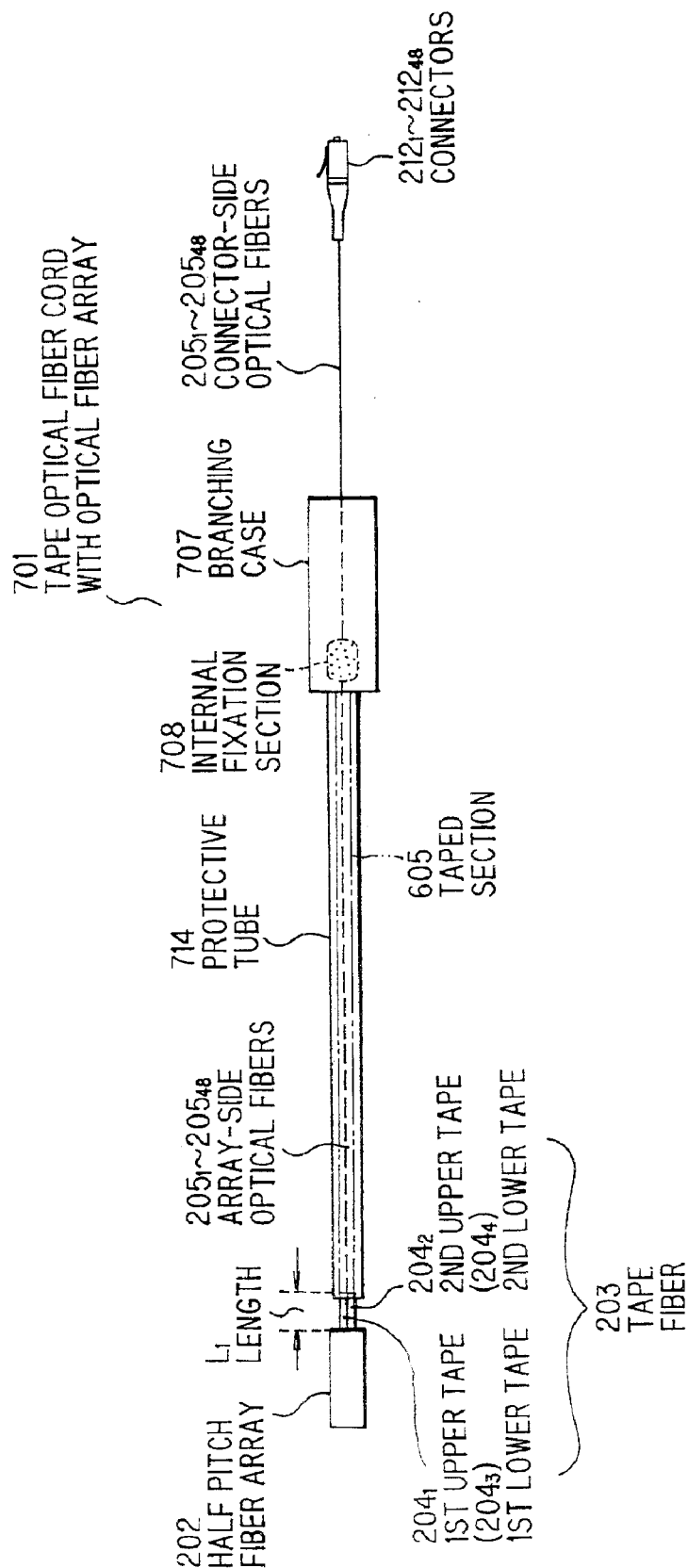
FIG. 22 is a side view of the tape optical fiber cord with an optical fiber array in the sixth preferred embodiment.

FIG. 21 is a top view of a tape optical fiber cord with an optical fiber array in the sixth preferred embodiment of the invention, and FIG. 22 a side view of the tape optical fiber cord with an optical fiber array in the sixth preferred embodiment. In FIGS. 8, 19, 21, and 22, like parts are identified with the same reference numerals, and the overlapped explanation thereof will be omitted. The tape optical fiber cord 701 with an optical fiber array in this sixth preferred embodiment is the same as the tape optical fiber cord with an optical fiber array in the fifth preferred embodiment, except that the tape fiber 203 has been covered with a protective tube 714. One end of the protective tube 714 is fixed in a fixation section 708 within a branching case 707 to the case.

In this preferred embodiment, the array-side optical fibers $205_1$ to $205_{48}$ have been brought to a flat cable-like tape 605. Therefore, the diameter of the protective tube 714 may be such that some space is left between the protective tube 714 and the tape 605 so that the provision of the protective tube 714 does not adversely affect the flex of the tape 605.

In the above preferred embodiments, materials for the protective tubes 214, 314, 514, and 714 have not been particularly described. Any flexible material, which has hitherto been used in cables, may of course be used without particular limitation. Further, the use of flame-retardant materials is beneficial for some environment under which the tape optical fiber cord is used.

Further, the above preferred embodiments have been explained by taking tape optical fiber cords with an optical fiber array of two-column, two-stage type. However, it is a matter of course that the construction of the column and the stage is not limited to this construction only. Further, although the above preferred embodiments have been explained by taking a 12-core tape core as an example, the invention can also be applied to the case where the number of cores is not 12.

In the above preferred embodiments, the connector-side optical fibers $211_1$ to $211_{48}$ are separated one by one and are delivered from the branching case 207. The invention, however, is not limited to this construction.

Figure 23:
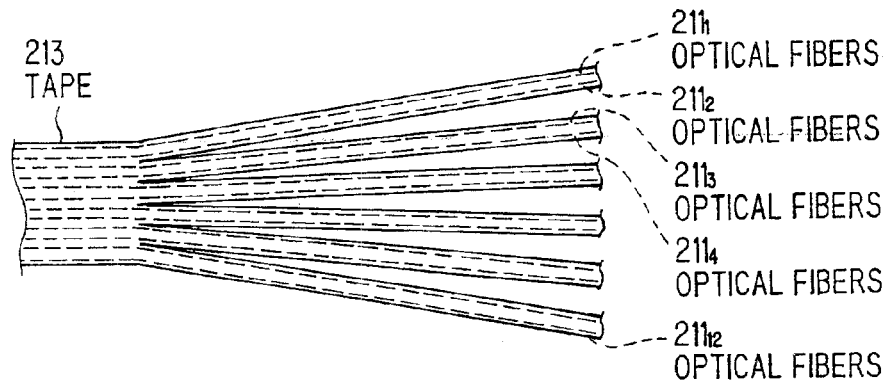
FIG. 23 is a plan view of the principal part of a variant of the invention in which, in the tape, the optical fibers are separated two fibers by two fibers.

FIG. 23 is a plan view of the principal part of a variant of the invention in which, in the tape, the optical fibers are separated two fibers by two fibers. Specifically, the fibers constituting the tape 213 are separated two optical fibers by two optical fibers, that is, separated into optical fibers ($211_1$ and $211_2$) and ($211_3$ and $211_4$) . . . . Thus, for example, for some materials of the tape 213, there is no need to separate the fibers one by one into optical fibers $211_1$, $211_2$ . . . . Even in this case, the occurrence of microbends can be prevented by separating the fibers a predetermined number of fibers by a predetermined number of fibers.

Figure 24:
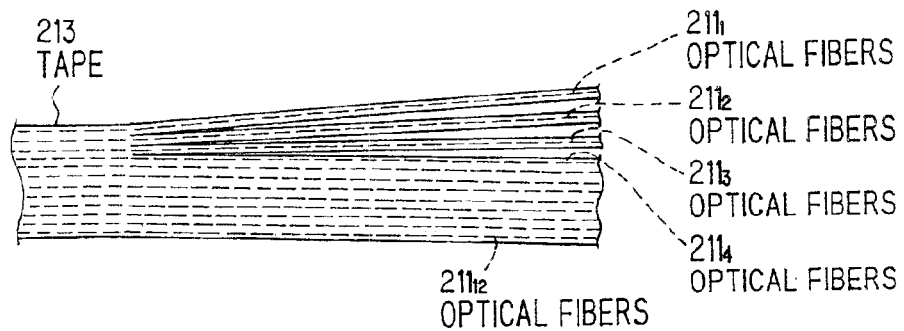
FIG. 24 is a plan view of the principal part of another variant of the invention in which, in a part of the tape, the optical fibers are separated one fiber by one fiber.

FIG. 24 is a plan view of the principal part of another variant of the invention in which, in a part of the tape, the optical fibers 211 are separated one fiber by one fiber. In this way, the number of optical fibers 211 to be separated may be varied. If necessary, a combination of the forms of separation, for example, a combination of the separation of optical fibers two fibers by two fibers with the separation of optical fibers three fibers by three fibers may be adopted. This also can practically prevent the occurrence of microbends.

Figure 25:
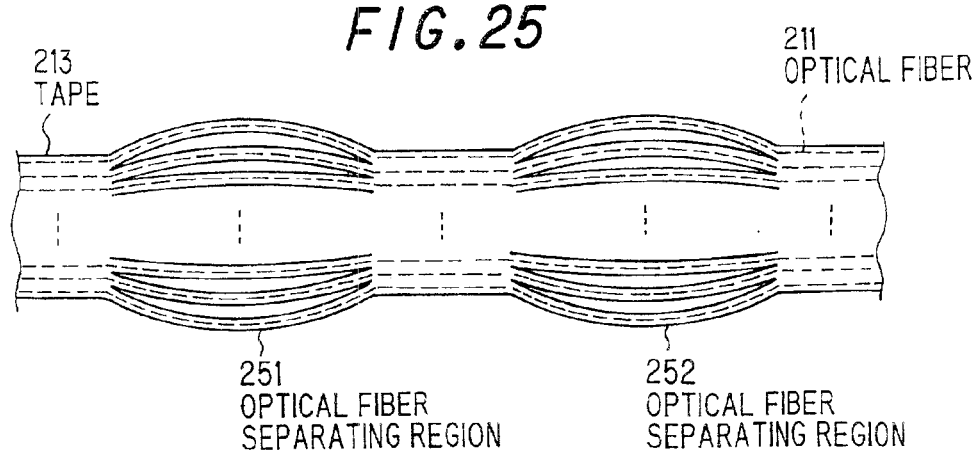
FIG. 25 is a plan view of the principal part of a variant of the invention in which, in two parts of the tape, the optical fibers are separated one fiber by one fiber or a plurality of fibers by a plurality of fibers.

FIG. 25 illustrates that the number of regions (parts) in which the optical fibers are separated is not limited to one. As shown in FIG. 25, there is no need to separate the optical fibers 211 one fiber by one fiber or a plurality of fibers by a plurality of fibers in only one region in the longitudinal direction of the tape 213, and, as shown in this drawing, the separation of the optical fibers may be carried out in two regions 251, 252 or more regions. When the regions for separating the optical fibers 211 are intermittently provided in this way, the tape 213 can be easily handled even in the case when the length of the tape 213 is long.

Although the above preferred embodiments have been explained by taking half pitch fiber arrays 202 as an example, the invention can also be applied to other pitches.

Figure 26:
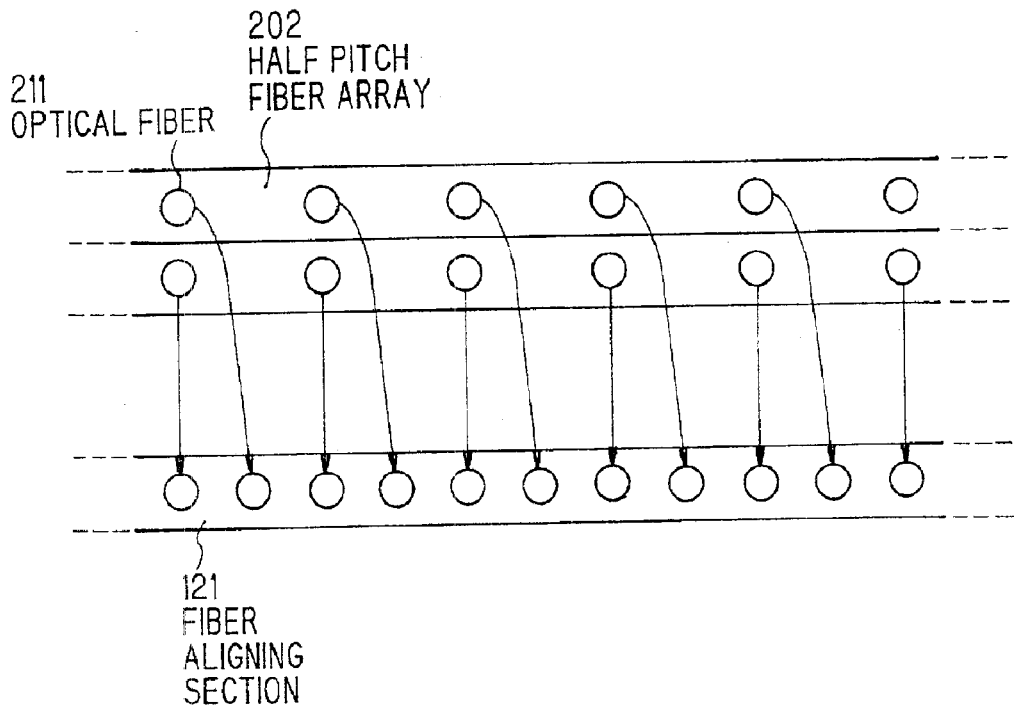
FIG. 26 is an explanatory view showing the relationship between the half pitch fiber array and the fiber aligning section in the preferred embodiment of the invention.

FIG. 26 shows the relationship between the half pitch fiber array and the fiber aligning section in the preferred embodiment of the invention. In FIG. 26, the pitch of the optical fibers in the fiber aligning section 121 is the half of the pitch of the optical fibers 211 in the half pitch fiber array 202 in which tapes have been stacked in two stages. By virtue of this construction, the individual optical fibers 211 can be associated one by one with the optical fibers in the fiber aligning section 121.

Figure 27:
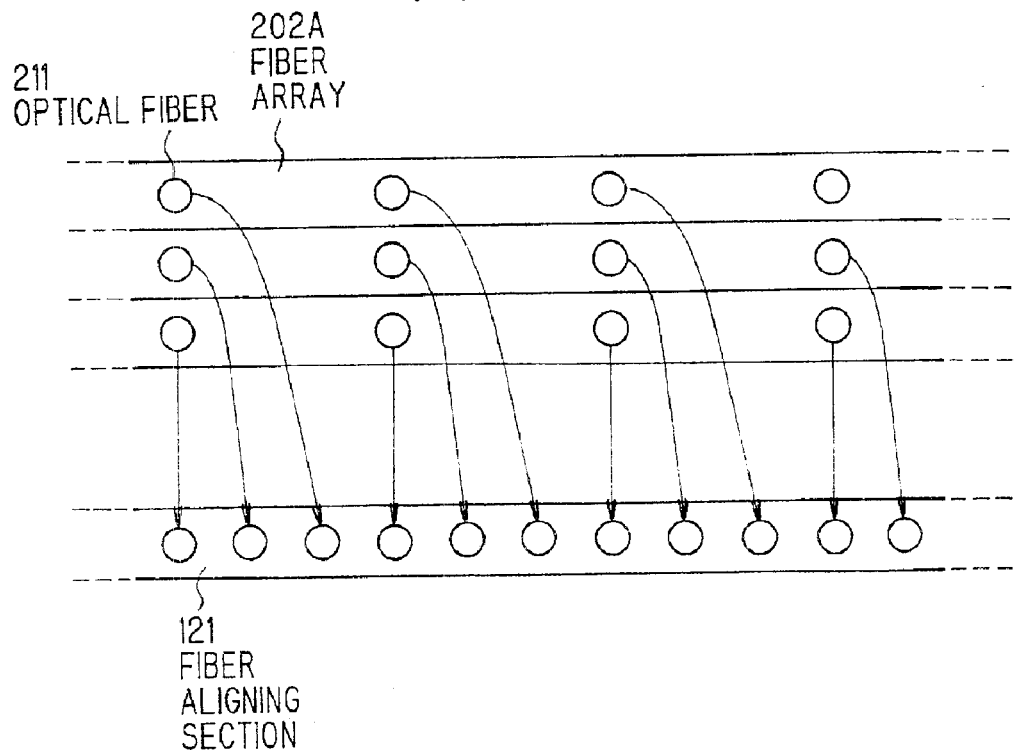
FIG. 27 is an explanatory view of a variant of the invention showing a comparison of the pitch in a three-stage stacked fiber array with the pitch in a fiber aligning section.

FIG. 27 shows a comparison of the pitch in a three-stage stacked fiber array with the pitch in a fiber aligning section. In this preferred embodiment, the pitch of the optical fibers in the fiber aligning section 121 is one-third of the pitch of the optical fibers 211 in the fiber array 202A in which tapes have been stacked in three stages. By virtue of this construction, the individual optical fibers 211 can be associated one by one with the optical fibers in the fiber aligning section 121. The invention can also be applied to the case where the pitch of the optical fibers 211 on the fiber array side is four times or the like that in the fiber aligning section 121.

As described above, according to the tape optical fiber cord with an optical fiber array in the above item (1) or (2), in a part or the whole of the position intermediate between the tape fiber on its fiber array fixation side and the predetermined position remote from the fixation side, the plurality of optical fibers are separated into a predetermined number of optical fiber units which is smaller in number than the number of the plurality of optical fibers. Therefore, upon the application of force in the bending direction to the tape fiber, the optical fibers are freely deformed independently of one another according to the applied force, and the direction of deformation by other optical fibers or the covering member is not restricted. Therefore, force, which locally deforms the optical fibers, is less likely to be applied, and, thus, the occurrence of microbends can be effectively avoided.

In such a state that the plurality of optical fibers fixed to the fiber array are aligned in a plurality of stages, upon the application of force in the bending direction to the tape fiber, a difference in length exists between the outer circumference and the inner circumference derived from stages such as upper and lower stages. According to the tape optical fiber cord with an optical fiber array in the above item (1), however, the optical fibers are freely deformed independently of one another according to the applied force, and, further, the deformation direction is not restricted by other optical fibers or the covering member. Therefore, even in the case of a tape optical fiber cord with an optical fiber array in which a large number of optical fibers are accommodated in a multistage construction, the occurrence of microbends can be effectively prevented.

According to the tape optical fiber cord with an optical fiber array in the above item (3), in the position intermediate between the tape fiber on its fiber array fixation side and the predetermined position remote from the fixation side, the plurality of optical fibers are arranged in a one stage construction one by one parallel to one another and are formed into a tape. Therefore, the width of this tape portion is increased according to the number of stages in the tape fiber. Unlike the cord described in the above item (2), however, even when this tape portion is bent in a direction orthogonal to the width, any difference in length derived from stages such as upper and lower stages does not occur between the inner circumference and the outer circumference. Therefore, force, which locally deforms the optical fibers, is less likely to be applied, and, thus, the occurrence of microbends can be effectively avoided. Further, since this large-width portion has been formed into a tape, the cord can be easy to handle even when the length of this tape portion is long.

According to the tape optical fiber cord with an optical fiber array in the above item (4), the portion, in which the plurality of optical fibers have been separated into a predetermined number of optical fiber units which is smaller in number than the plurality of optical fibers, can be protected, and, further, even when this portion is long, the region, where the individual optical fibers are present, can be restricted to some extent. By virtue of this, the cord is made easy to handle.

According to the tape optical fiber cord with an optical fiber array in the above item (5), the portion, in which the plurality of optical fibers have been arranged in one stage one by one parallel to one another and have been formed into a tape, is covered with a protective tube. Therefore, the tape portion can be made more thin and flexible. This can further reduce stress applied to the individual optical fibers.

According to the tape optical fiber cord with an optical fiber array in the above item (6), the protective tube is fixed at the predetermined position, where the tape fiber has been fixed, or a position near the predetermined position. This improves the whole work. Further, according to the tape optical fiber cord with an optical fiber array in the above item (7), the provision of the rearrangement section in the identical position can improve the workability.

According to the tape optical fiber cord with an optical fiber array in the above item (8), one end of the protective tube is fixed to the end of the case containing the rearrangement section. The fixation of the protective tube to the end of the case facilitates the fixation work and further can eliminate the need to make the inner diameter of the case larger than the size of the protective tube.

According to the tape optical fiber cord with an optical fiber array in the above item (9), the fixation of the protective tube within the case enables the protective tube to be stably mounted.

According to the tape optical fiber cord with an optical fiber array in the above item (12), since only one end of the protective tube is fixed, when the tube has been bent, the other open end of the protective tube can be freely moved. This can reduce force applied to the optical fibers provided within the protective tube.

According to the tape optical fiber cord with an optical fiber array in the above item (13), in a part of the region where the plurality of optical fibers have been separated one by one, the protective tube is fixed to the optical fiber. By virtue of this construction, the movement of the protective tube may be prevented in such a state that the force applied to the optical fibers has been reduced. This is true of the tape optical fiber cord with an optical fiber array in the above item (14).

According to the tape optical fiber cord with an optical fiber array in the above item (16), the flame redundancy of the protective tube can protect the optical fibers.

According to the tape optical fiber cord with an optical fiber array in the above item (17), the protective tube is fixed to the fiber array on its fixation side. As with the tape optical fiber cord with an optical fiber array in the above item (6) wherein the protective tube is fixed to the other side of the cord, even when the protective tube has been bent, the protective tube is not locally and unnaturally deformed. Therefore, the deformation direction of the optical fibers arranged within the protective tube is less likely to be restricted, and the occurrence of microbends can be effectively avoided.

According to the tape optical fiber cord with an optical fiber array in the above item (18), the pitch of the optical fibers in the fiber array is the half of the pitch (half pitch) of the optical fibers in the tape fiber. By virtue of this construction, for representative tape optical fiber cords with an optical fiber array, the occurrence of microbends can be reduced.

The invention has been described in detail with particular reference to preferred embodiments, but it will be understood that variations and modifications can be effected within the scope of the invention as set forth in the appended claims.

What is claimed is:

1. An optical fiber tape, comprising:
   a fiber array adapted to be connected to an optical waveguide;
   a fixation section;
   a tape fiber including a plurality of tape sections, each tape section produced by aligning a plurality of optical fibers and forming the aligned optical fibers into a tape section, said tape sections being fixed to the fiber array, said plurality of optical fibers, over a portion of said tape fiber between the fiber array and the fixation section, being separated into a predetermined number of optical fiber groups which is smaller in number than the number of said plurality of optical fibers, said groups being fixed to the fixation section;
   a rearrangement section for rearranging the optical fibers, said rearrangement section being located at the fixation section or a position near the fixation section; and
   a protective tube covering said plurality of optical fibers over said portion of the tape fiber.

2. The optical fiber tape according to claim 1, wherein the protective tube is fixed to the optical fibers at the fixation section or a position near the fixation section.

3. The optical fiber tape according to claim 1, further comprising:

a case containing the rearrangement section, with one end of the protective tube fixed to one end of the case.

4. The optical fiber tape according to claim 1, further comprising:
a case containing the rearrangement section, with one end of the protective tube fixed within the case.

5. The optical fiber tape according to claim 1, wherein one end of the protective tube is fixed.

6. The optical fiber tape according to claim 1, wherein the protective tube is fixed to optical fibers where the plurality of optical fibers are separated.

7. The optical fiber tape according to claim 1, wherein the order of arrangement of the optical fibers on an end of the rearrangement section remote from the fiber array is identical to the order of arrangement of the optical fibers in the fiber array.

8. The optical fiber tape according to claim 1, wherein the protective tube is formed of a flame-retardant material.

9. The optical fiber tape according to claim 1, wherein the protective tube is fixed to the fiber array adjacent the fixation section.

10. The optical fiber tape according to claim 1, wherein the pitch of the optical fibers in the fiber array is half of the pitch of the separated optical fibers in the portion in the tape fiber between the fiber array and the fixation section.

11. The optical fiber tape according to claim 3, wherein the order of arrangement of the optical fibers on an end of the rearrangement section remote from the fiber array is identical to the order of arrangement of the optical fibers in the fiber array.

12. The optical fiber tape according to claim 4, wherein the order of arrangement of the optical fibers on an end of the rearrangement section remote from the fiber array is identical to the order of arrangement of the optical fibers in the fiber array.

13. An optical fiber tape, comprising:
a fiber array adapted to be connected to an optical waveguide;
a fixation section;
a tape fiber including a plurality of tape sections, each tape section produced by aligning a plurality of optical fibers and forming the aligned optical fibers into a tape section, said tape sections being fixed to the fiber array, said plurality of optical fibers, over a portion of said tape fiber between the fiber array and the fixation section, being separated and arranged parallel to one another and being formed into a tape, said tape being fixed to the fixation section;
a rearrangement section for rearranging the optical fibers, said rearrangement section being located at the fixation section or a position near the fixation section; and
a protective tube covering said plurality of optical fibers over said portion of the tape fiber.

14. The optical fiber tape according to claim 13, wherein said plurality of optical fibers are arranged in a plurality of columns having a plurality of stages.

15. The optical fiber tape according to claim 14, wherein the number of columns is two and the number of stages is two.

16. The optical fiber tape according to claim 13, wherein, in the portion at which said plurality of optical fibers are arranged parallel to one another and are formed into a tape, the protective tube is fixed to the optical fiber tape.

17. The optical fiber tape according to claim 13, wherein the pitch of the optical fibers in the fiber array is half of the pitch of the parallel optical fibers in the portion in the tape fiber between the fiber array and the fixation section.

18. The optical fiber tape according to claim 13, wherein the protective tube comprises a flame-retardant material.

19. An optical fiber tape, comprising:
a fiber array adapted to be connected to an optical waveguide;
a fixation section;
a tape fiber including a plurality of tape sections, each tape section comprising a plurality of optical fibers, said tape sections being fixed to the fiber array, said plurality of optical fibers being separated over a portion of said tape fiber between the fiber array and the fixation section, said optical fibers being fixed to the fixation section;
a rearrangement section for rearranging the optical fibers, said rearrangement section being located at the fixation section or a position near the fixation section; and
a protective tube covering said optical fibers over said portion of said tape fiber.

20. The optical fiber tape according to claim 19, wherein the protective tube permits the optical fibers to freely deform and to be flexed within the protective tube.

21. The optical fiber tape according to claim 19, wherein the protective tube comprises a flame retardant material.

* * * * *